United States Patent [19]

Cornie

[11] Patent Number: 5,553,658
[45] Date of Patent: Sep. 10, 1996

[54] METHOD AND APPARATUS FOR CASTING

[75] Inventor: James A. Cornie, Cambridge, Mass.

[73] Assignee: Massachusetts Institute of Technology, Cambridge, Mass.

[21] Appl. No.: 221,874

[22] Filed: Apr. 1, 1994

Related U.S. Application Data

[63] Continuation of Ser. No. 60,449, May 10, 1993, Pat. No. 5,322,109.
[51] Int. Cl.⁶ .......................... B22D 19/14; B22D 27/09
[52] U.S. Cl. ...................... 164/97; 164/120; 164/256
[58] Field of Search .................. 164/120, 122.1, 164/122.2, 256, 258, 97, 98

[56] References Cited

U.S. PATENT DOCUMENTS

| | | | |
|---|---|---|---|
| 3,547,180 | 12/1970 | Cochran et al. | 164/61 |
| 3,670,802 | 6/1972 | Krick et al. | 164/258 |
| 3,913,657 | 10/1975 | Banker et al. | 164/62 |
| 4,492,265 | 1/1985 | Donomoto et al. | 164/493 |
| 4,508,158 | 4/1985 | Amateau et al. | 164/110 |
| 4,572,270 | 2/1986 | Funatani et al. | 164/97 |
| 4,573,517 | 3/1986 | Booth et al. | 164/61 |
| 4,832,105 | 5/1989 | Nagan et al. | 164/61 |
| 4,889,177 | 12/1989 | Charbonnier et al. | 164/97 |
| 5,097,887 | 3/1992 | Schmid et al. | 164/75 |
| 5,111,870 | 5/1992 | Cook | 164/61 |
| 5,111,871 | 5/1992 | Cook | 164/63 |
| 5,335,711 | 3/1994 | Paine | 164/66.1 |

FOREIGN PATENT DOCUMENTS

| | | | |
|---|---|---|---|
| 340957 | 11/1989 | European Pat. Off. | |
| 0340957 | 11/1989 | European Pat. Off. | 164/100 |
| 3220744 | 6/1982 | Germany. | |
| 3603310 | 2/1986 | Germany. | |
| 62-161461 | 7/1987 | Japan | 164/97 |
| 2195277 | 4/1988 | United Kingdom. | |

OTHER PUBLICATIONS

"Fabrication of cast particle–reinforced metals via pressure infiltration", Klier et al., pp. 2519–2526, 1991, *Journal of Materials Science*, 26.

"An apparatus for pressure casting of fibre–reinforced high–temperature metal–matrix composities", Nourbakhsh et al., pp. 898–902, 1988, *Journal Physics E. Scientific Instrument*, 21.

"Processing of continuous–ceramic–fiber–reinforced intermetallic composites by pressure casting", Nourbakhsh et al., pp. 133–141, 1991, *Materials Science and Engineering*, A144.

"Particulate Wetting and Particle: Solid Interface Phenomena in Casting Metal Matrix Composites", Russell et al., pp. 61–91, 1986, *Proceedings of the Symposium on Interfaces in Metal Matrix Composites*, New Orleans, Louisiana TMS–AIME, 1986.

"Pressure Casting of Fiber–Reinforced Metals", Masur et al., pp. 2.320–2.329, 1987, *ICCM-VI, Proceedings of the Sixth International Conference on Composite Materials*, London, 1987.

"Pressure Infiltration Processing of P–55(Graphite) Fiber Reinforced Aluminum Alloys", Cornie et al., pp. 851–875, 1990, *Ceramic Transactions, Advanced Composite Materials: Processing, Microstructures, Bulk and Interfacial Properties, Charaterization Mehtods and Applications*, 19.

(List continued on next page.)

*Primary Examiner*—Jack W. Lavinder
*Assistant Examiner*—Randolph S. Herrick
*Attorney, Agent, or Firm*—Florence Fusco McCann

[57] ABSTRACT

A method for pressure infiltration casting is provided wherein steps of preheating and evacuating a mold cavity and infiltrant charge are carried out in a separate vessel from a pressure vessel wherein the mold cavity is filled, allowing for rapid finished article throughput. An apparatus for pressure infiltration casting is also provided.

35 Claims, 13 Drawing Sheets

OTHER PUBLICATIONS

"Wetting of Ceramic Particulates with Liquid Aluminum Alloys", Se–Yong Oh, pp. 105–107, 1987, Ph.D. Thesis, *Massachusetts Institute of Technology*.

"Designing Interfaces in Inorganic Matrix Composites", Cornie et al., pp. 32–38, 1991, *MRS Bulletin*, 16.

"Kinetics of Fiber Preform Infiltration", Mortensen et al., pp. 7–13, 1988, *Proceedings of the International Symposium on Advances in Cast Reinforced Metal Composites*, Chicago, Illinois, 1988.

"Wetting of Ceramic Particulates with Liquid Aluminum Alloys: Part I. Experimental Techniques", Oh et al., pp. 527–532, 1989, *Metallurgical Transactions A*, 20A.

"Wetting, Fluidity and Solidation in Metal Matrix Composite Castings: A Research Summary", Cornie et al., pp. 2.297–2.319, 1987, *ICCM–VI, Proceedings of the Sixth International Conference on Composite Materials*, London, 1987.

"Properties of TaC–based metal–matrix composites produced by melt infiltration" Composites vol. 23, No. 1, (Jan. 1992) p. 47–53.

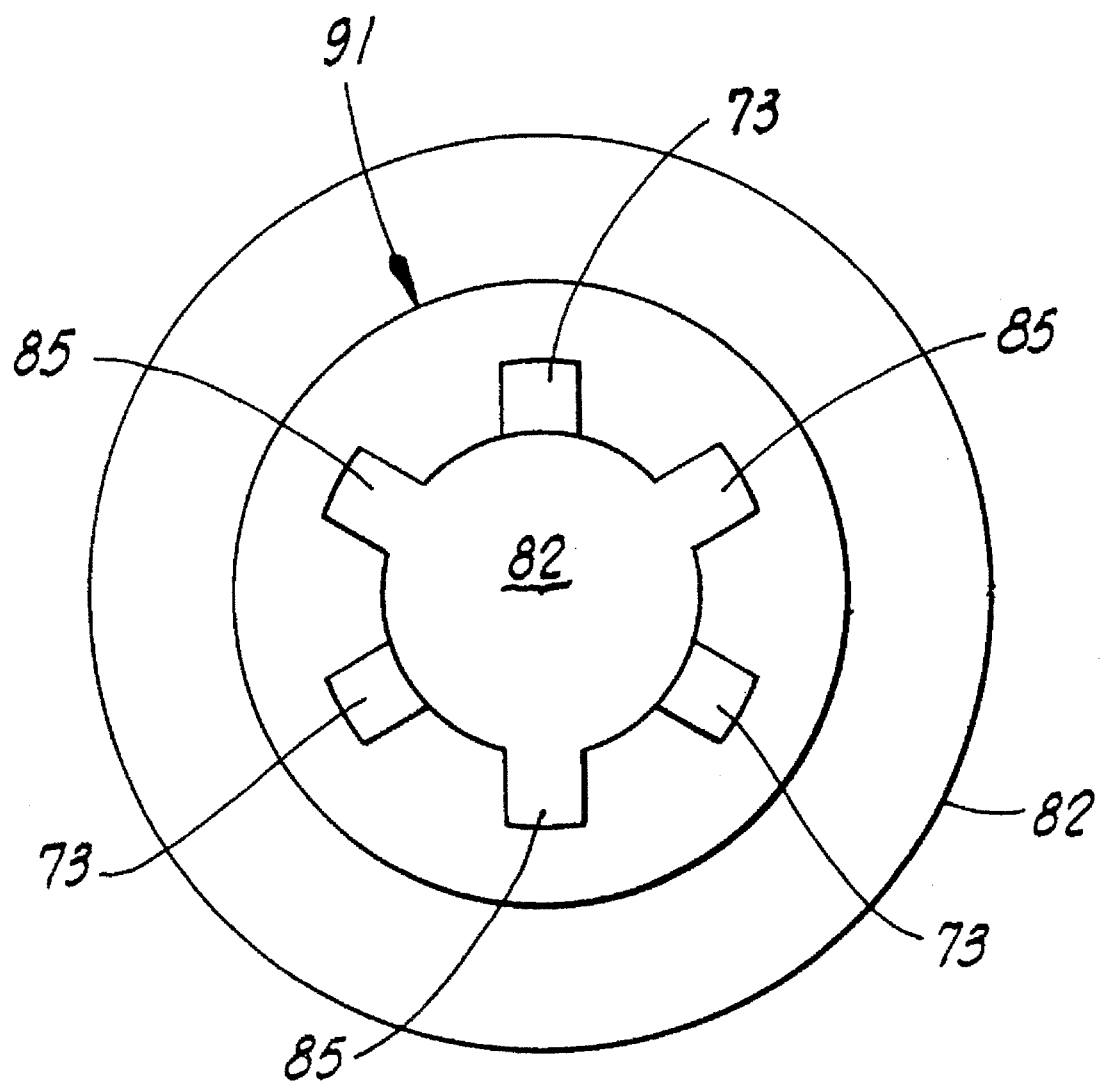
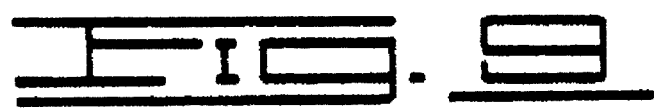

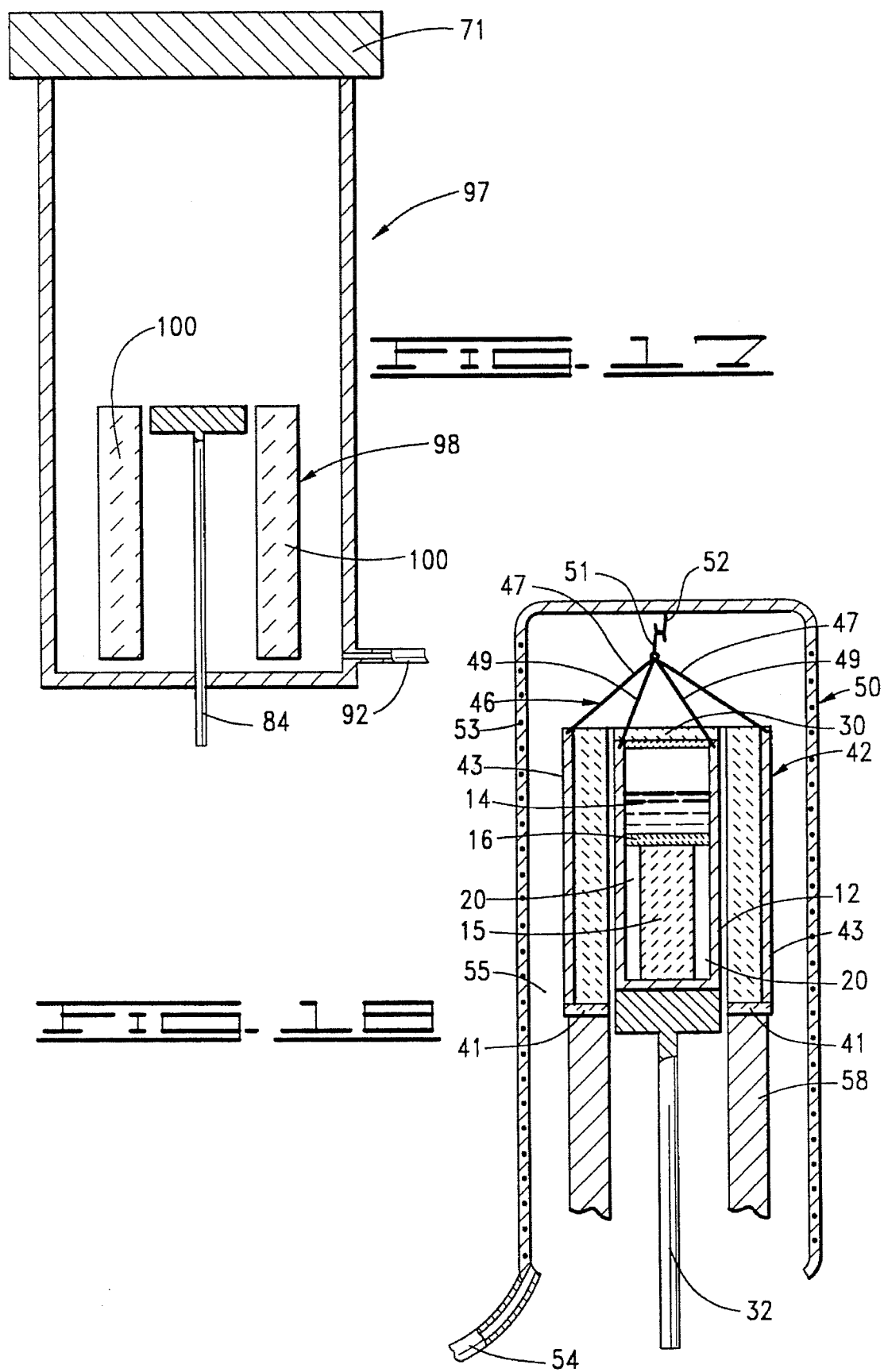

METHOD AND APPARATUS FOR CASTING

This invention was made with government support under Grant No. N00014-90-J1812 by Navy. The government has certain rights in the invention.

This is a continuation of application (s) Ser. No. 08/060,449 filed May 10, 1993 U.S. Pat. No. 5,322,109.

BACKGROUND OF THE INVENTION

1. Field of the Invention

The invention relates to a method and apparatus for pressure infiltration casting.

2. Description of the Prior Art

In currently used pressure infiltration processes, as described by U.S. Pat. Nos. 5,111,870 and 5,111,871 to Cook and in general reviews of the state of the pressure infiltration casting art such as Cook et al., "Pressure infiltration casting of metal matrix composites", Materials Science and Engineering, A144, (1991) pages 189–206, a cold mold containing a preform is loaded into a combined pressure vessel/vacuum furnace. A charge of solid infiltrant which can be metal is placed on top of the preform and is separated from the preform by a filter. The filter is characterized by sufficiently low permeability and lack of wetting with the liquid infiltrant to prevent premature infiltrant penetration into the preform and chemical inertness with respect to the infiltrant to avoid contamination of the infiltrant. The filter material also acts as a thermal insulator so that infiltrant charge temperature and preform temperature can be independently controlled.

Next, the preform is heated and the solid infiltrant charge is melted under vacuum in the pressure vessel/vacuum furnace. Since the infiltrant is melted in a vacuum and the mold is not gas permeable, a vacuum is isolated in the preform contained in the mold cavity.

Then, the pressure vessel/vacuum furnace is pressurized to create a pressure gradient between the pressurized mold exterior and the vacuum isolated in the preform contained within the mold interior. It is this pressure differential that drives the infiltration process.

After infiltration is complete, the final step of the process is solidification of the infiltrated preform. Solidification of the infiltrated preform is also conducted within the pressure vessel/vacuum furnace by providing a temperature gradient appropriate to result in directional solidification. Several techniques to obtain directional solidification in a pressure infiltration process are known in the art including lowering of the infiltrated preform into a "chill zone" as demonstrated by Klier et al., "Fabrication of cast particle-reinforced metals via pressure infiltration", Journal of Materials Science, 26, (1991), pages 2519–2526 or, alternatively, lifting a cooled chill device to contact the preform as described in U.S. Pat. Nos. 5,111,870 and 5,111,871 to Cook. During directional solidification in a pressure infiltration process, liquid infiltrant in the hot zone of the infiltrated preform solidifies last and serves as a sprue and reservoir for feeding porosity as the rest of the infiltrated preform solidifies.

The three steps involved in the foregoing prior art pressure infiltration processes, Step (1) of preform and infiltrant charge heating and evacuation, Step (2) of preform infiltration, and Step (3) of infiltrated preform solidification, each take different amounts of time. Preform and infiltrant charge heating and evacuation take the longest amount of time, infiltrated preform solidification takes less time than preform and infiltrant charge heating and evacuation and pressure infiltration of the preform takes the least time. For example, using a two inch by four inch by eight inch mold cavity, 600 grams of aluminum infiltrant and a silicon carbide particulate preform as would typically be encountered in use of prior art pressure infiltration methods, in the range of from about 2 to about 3 hours are needed to preheat the preform and melt the aluminum infiltrant charge under vacuum, less than about 1 minute is required to infiltrate the heated preform with the molten aluminum infiltrant and less than about 6 minutes are needed to cool the mold to a temperature less than the solidus temperature of the aluminum infiltrant. Once the mold is removed from the pressure vessel/vacuum furnace, the pressure vessel/vacuum furnace can be used to resume the three step pressure infiltration process.

While the foregoing prior art pressure infiltration process is a highly effective and controllable process, the throughput of finished pressure infiltrated articles is inherently limited by the slowest step of the pressure infiltration process, that of heating the preform and melting the infiltrant charge, which as demonstrated by the foregoing example, is as long as 3 hours by comparison with a total of at most 16 minutes for the other two steps of the process, preform infiltration and infiltrated preform solidification combined. Although the pressure vessel/vacuum furnace pressure infiltration capability is only needed during the two shortest steps of the pressure infiltration process, this tooling is in constant use, even for the most time consuming steps of the process, because it is also used for preform and infiltrant heating and evacuation.

Thus, according to existing pressure infiltration techniques, preform and infiltrant heating and evacuation as well as pressure infiltration are performed sequentially in the same pressure vessel/vacuum furnace tooling, thus occupying this multipurpose tooling for all three stages of the pressure infiltration casting process, when, in fact, the pressure vessel function of the tooling is only required for the rapidly accomplished step of pressure infiltration and solidification. These existing pressure infiltration processes are limited by their slowest step, preform and infiltrant heating.

Thus, there exists a need for a rapid and economical pressure infiltration process wherein the throughput of finished articles is limited only by the solidification rate of the infiltrated mold cavity and wherein the steps of mold cavity and infiltrant heating and evacuation are performed in separate apparatus from the steps of mold cavity infiltration and infiltrated mold cavity solidification.

SUMMARY OF THE INVENTION

The invention provides a rapid and economical pressure infiltration process which operates at the fundamental limit of processing time and finished article throughput, the filled mold/infiltrated preform solidification rate. Such rapid throughput is achieved by heating and evacuating the mold cavity, which can contain a preform, and the infiltrant in furnaces and/or vacuum furnaces which are separate from the pressure vessel wherein mold cavity filling and filled mold cavity solidification are performed.

In one aspect of the invention, a method for pressure infiltration casting is provided including the steps of (1) providing a mold cavity, which can contain a preform, and an infiltrant charge: (2) preheating the mold cavity and the infiltrant charge in a heating vessel to a form a preheated mold cavity and a molten infiltrant charge; (3) transferring the preheated mold cavity and the molten infiltrant charge to a pressure vessel; (4) pressurizing the pressure vessel so that the molten infiltrant charge fills the preheated mold cavity and drives molten infiltrant charge into fine details of the mold cavity to form a filled mold cavity and (5) cooling the filled mold cavity so that the molten infiltrant solidifies to form a finished article.

In another aspect of the invention, an apparatus for pressure infiltration casting is provided including (1) a first heating vessel including a chamber for containing a mold cavity and an infiltrant charge, and, optionally, a preform for heating a mold cavity to produce a heated mold cavity. The first heating vessel also contains and an infiltrant charge to produce a heated mold cavity and molten infiltrant charge; The apparatus further includes (2) a pressure vessel for filling the mold cavity with the infiltrant charge under pressure to produce a filled mold cavity. The apparatus further includes (3) a transfer chamber for holding said mold cavity and molten infiltrant during transfer from said first heating vessel to said pressure vessel. The apparatus further includes (4) a cooling chamber for cooling said filled mold cavity to form a finished article.

It is an object of this invention to provide a method for pressure infiltration casting according to which the mold cavity, which can contain a preform, and infiltrant charge are heated and evacuated in separate heating vessels from the pressure vessel wherein pressure infiltration occurs so that a rapid throughput of finished articles limited only by the solidification rate of the filled mold cavity and/or infiltrated preform is achieved.

It is a further object of the invention to provide a pressure infiltration casting apparatus which includes a separate heating vessel and pressure vessel as well as a transfer chamber for conveying the heated mold cavity and infiltrant from the heating vessel to the pressure vessel to undergo pressure infiltration therein. Thus, the mold cavity and infiltrant can be heated and infiltrated in separate vessels so that a single multipurpose vessel is not occupied during performance of only one of the multipurpose vessel functions so that maximum finished article throughput, limited only by the solidification rate of the filled mold cavity and/or infiltrated preform, is possible.

Other and further objects, features and advantages of the present invention will be readily apparent to those skilled in the art upon reading the description of the preferred embodiments which follows.

BRIEF DESCRIPTION OF THE DRAWINGS

FIG. 9 is a schematic view along the line 9—9 of FIG. 8.

FIG. 17 is a schematic illustration in cross-section showing a separate chill vessel.

FIG. 18 is a schematic illustration in cross-section showing a heated pressure vessel.

DETAILED DESCRIPTION OF THE INVENTION

Figure 1:
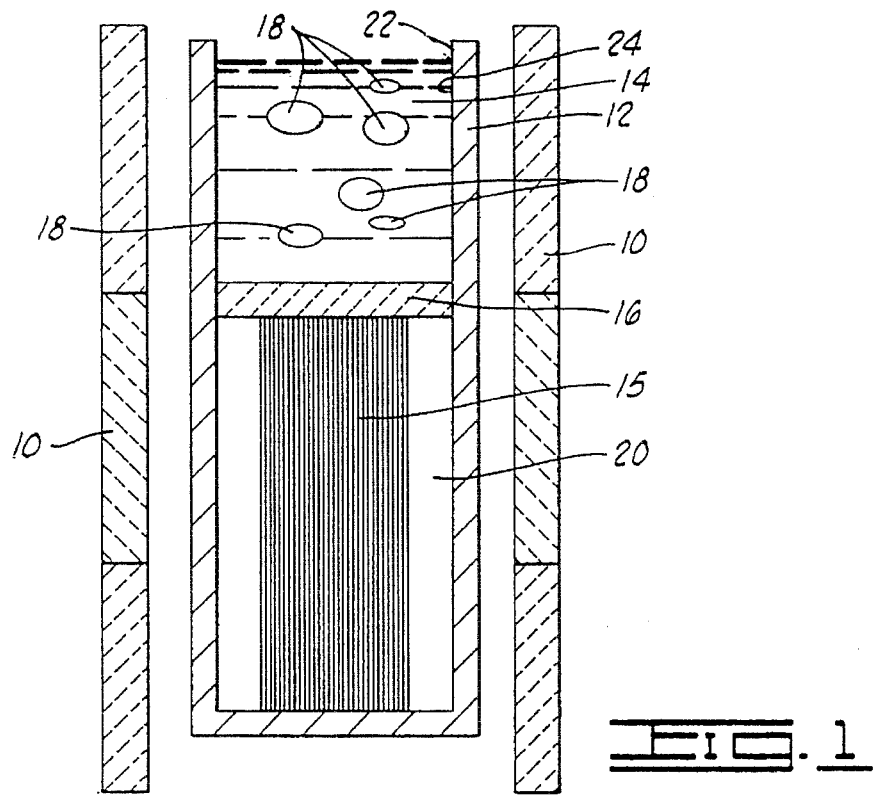
FIG. 1 is a schematic illustration in cross section showing the heating and evacuation of a preform and molten infiltrant in a vacuum furnace.

The invention provides a method for pressure infiltration casting of an article which includes steps of preheating a mold cavity, which can contain a preform, and an infiltrant charge in a first heating vessel so that a preheated mold cavity and molten infiltrant charge are produced, then transferring the preheated mold cavity and the molten infiltrant charge to a pressure vessel which is pressurized so that the molten infiltrant charge infiltrates the preheated mold cavity to produce a filled mold cavity which is cooled so that the molten infiltrant solidifies to form a finished article.

The invention also provides an apparatus for pressure infiltration casting which includes a first heating vessel for heating the mold cavity and the infiltrant charge to produce a heated mold cavity and molten infiltrant charge a chamber which contains a mold cavity and an infiltrant charge; a transfer chamber for containing the heated mold cavity and molten infiltrant charge as it is removed from the first heating vessel and transferred to a separate pressure vessel and a cooling chamber for solidifying the filled mold cavity and/or infiltrated preform to produce a finished article.

By heating and evacuating the mold cavity, which can optionally contain a preform, and the infiltrant charge in furnaces and/or vacuum furnaces which are separate from the pressure vessel wherein mold cavity infiltration is performed, both the method and the apparatus of the invention allow for rapid throughput of pressure infiltrated articles limited only by the solidification rate of the filled mold cavity and/or infiltrated preform. Both the method and the apparatus of the invention provide separate vessels wherein each of the steps of a pressure infiltration casting process can be separately carried out. By contrast, pressure infiltration casting methods and apparatus wherein all the steps of the pressure infiltration casting process are performed sequentially within the same multipurpose vessel require that a mold cavity, which can optionally contain a preform, and infiltrant charge cannot be heated and evacuated while an already heated mold cavity is filled with the molten infiltrant. The method and apparatus of the invention allow for more efficient "parallel processing" whereby a mold cavity and an infiltrant charge can be heated in dedicated heating vessels while another, already heated mold cavity and infiltrant charge is pressure infiltrated in a separate, dedicated pressure vessel.

As used in this description and in the claims, the term "preform" refers to a porous body, which can include a continuous fiber reinforcement, a primary particulate reinforcement phase, or a combination of a continuous fiber reinforcement phase with a secondary particulate reinforcement phase which can be subsequently infiltrated to form an infiltrated preform.

As used herein, the term "infiltration" refers to the injection under pressure of a molten liquid, the molten infiltrant charge, which can be a molten metal, metal alloy or intermetallic compound, into a mold cavity or preform under pressure.

According to the method of the invention, the heating vessel is opened, the preheated mold cavity, which can include a preform, and molten infiltrant charge are removed from the heating vessel and transferred to an open pressure vessel which after loading is closed for pressurizing to fill or infiltrate the preheated mold cavity, which can include a preform, with the molten infiltrant charge.

Thus, using the method and apparatus of the invention, it is possible to produce unreinforced castings having superior surface qualities, better tolerances, thinner sections and more complex, finely detailed shapes than can be achieved using gravity-driven casting techniques. Using the same method and apparatus, but with the introduction of a preform into the mold cavity, reinforced castings can also be produced.

The preform can include a continuous fiber reinforcement such as a monofilament fiber reinforcement or a multifilament tow fiber reinforcement. Typical continuous fiber reinforcement volume fractions are in the range of from about 0.15 to about 0.85, more preferably in the range of from about 0.30 to about 0.65 and most preferably in the range of from about 0.40 to about 0.60.

Monofilament fiber reinforcements such as slurry-spun alumina, sol-gel derived alumina, sapphire, yttrium aluminum garnet (YAG), yttria-alumina eutectic, titanium diboride, boron nitride, boron carbide and titanium carbide monofilaments are suitable for use with the process of the invention. Monofilament fiber diameters can be in the range of from about 50 µm to 250 µm, more preferably in the range of from about 75 µm to about 200 µm and most preferably in the range of from about 100 µm to about 150 µm.

Suitable multifilament tow fiber reinforcements include aluminum oxide, silicon carbide, organometallic-derived silicon carbide, pitch-based graphitic carbon, organometallic-derived silicon nitride, polyacrylonitrile (PAN)-based, organometallic-derived titanium carbide and organometallic-derived mixed titanium carbide and silicon carbide multifilament tow fiber reinforcements. The individual fibers of the multifilament tow can have individual fiber diameters in the range of from about 3 µm to about 50 µm, more preferably in the range of from about 6 µm to about 30 µm and most preferably in the range of from about 10 µm to about 20 µm.

The preform can also include a primary particulate reinforcement phase such as a ceramic like titanium diboride or aluminum oxide; a high melting point metal like Mo, W, Cr, Nb or Ta; and refractory material like titanium diboride, aluminum oxide, yttrium oxide, boron nitride, silicon carbide, titanium carbide, zirconium carbide, hafnium carbide, tungsten carbide, niobium carbide, boron carbide, titanium nitride, zirconium nitride, hafnium nitride or diamond particulate reinforcements.

The preform can also be a hybrid preform including a secondary particulate reinforcement phase which can be a ceramic, high melting point metal, or a refractory material, a brittle material which is not reactive with the molten infiltrant charge. Ceramic secondary particulate reinforcement phases can include titanium diboride and aluminum oxide. High melting point metal secondary particulate reinforcement phases can be Mo, W, Cr, Nb and Ta. Refractory material secondary particulate reinforcement phases can be titanium diboride, aluminum oxide, yttrium oxide, boron nitride, silicon carbide, silicon nitride, titanium carbide, zirconium carbide, hafnium carbide, tungsten carbide, niobium carbide, boron carbide, titanium nitride, zirconium nitride and hafnium nitride. The secondary particulate reinforcement phase can be present in the interfiber spacing of the hybrid preform at a volume fraction of the interfiber spacing in the range of from about 0.50 to about 0.80, more preferably in the range of from about 0.50 to about 0.70, with the continuous fiber reinforcement being present at a volume fraction in the range of from about 0.20 to about 0.80, more preferably in the range of from about 0.30 to about 0.70, and most preferably in the range of from about 0.40 to about 0.60.

The infiltrant charge can be a metal such as aluminum, silicon, magnesium, nickel, zinc, copper, iron, tin, silver, gold, platinum, rhodium, silicon, titanium, chromium, cobalt, vanadium, niobium, molybdenum, zirconium and alloys thereof, or can be an intermetallic compound such as NiAl, $Ni_3Al$, TiAl, FeAl, $Fe_3Al$, CoAl and $Co_3Al$.

The method of the invention can be used for preparation of continuously reinforced composites, particulate-reinforced and hybrid reinforced composites containing the already-described reinforcements and can also be used to prepare bulk compounds by reactive infiltration. In a reactive infiltration process, the preform is consumed by reaction with the molten infiltrant charge to result in production of the bulk compound. For example, a carbon preform can be infiltrated with a silicon molten infiltrant to form bulk silicon carbide.

According to one embodiment of the invention, trapped gas contained within the preform and the molten infiltrant charge is removed by preheating the preform and the molten infiltrant charge in a vacuum heating vessel which is evacuated to remove the trapped gas from the preform and the molten infiltrant charge.

According to another embodiment of the invention, a selected gas atmosphere is provided in the heating vessel wherein the preform and the infiltrant charge are heated, such as an oxygen, ambient air, compressed air, argon, helium or nitrogen atmosphere, to protect the surfaces of fibers in the preform. The molten infiltrant charge can be positioned above the preform so that it can be poured into the preform.

After the preform and the infiltrant charge have been heated in the heating vessel in the selected atmosphere, the preheated preform and the molten infiltrant charge are removed from the heating vessel and transferred to a vacuum vessel, which can be heated in order to retain the molten infiltrant charge in a molten state, to remove trapped gas from the preform and molten infiltrant charge so that a vacuum can be isolated in the preheated preform.

FIG. 1 schematically shows the step of preheating a preform and infiltrant charge in an inert atmosphere in a heating vessel. Furnace elements 10 surround gas impermeable mold vessel 12 which can be constructed of a material such as steel, quartz, alumina or other metals or ceramics which are gas impermeable and wherein molten infiltrant charge 14 is separated from staple preform 15 by filter 16 which can be made of alumina staple fiber, fiberglass, mullite fiber, carbon fiber, Fiberfrax™, silicon carbide foam, carbon foam, alumina foam or zirconia foam having an approximate porosity of from about 15% to about 85%. Usually, low volume fraction filters are used. When mold vessel 12 is placed in a vacuum vessel for evacuation, dissolved gases within the melt and trapped within preform 15, are removed so that a vacuum is isolated in preform 15 and mold cavity 20. Gas bubbles 18 move through the molten metal during evacuation, resulting in evacuation of the mold cavity containing the preform. The vacuum is maintained because a vacuum seal is established at surface 22 where molten infiltrant charge 14 meets surface 24 of mold vessel 12. Typical vacuum levels attained in the vacuum vessel are in the range of from about 10 μm Hg to about 1 mm Hg.

Figure 2:
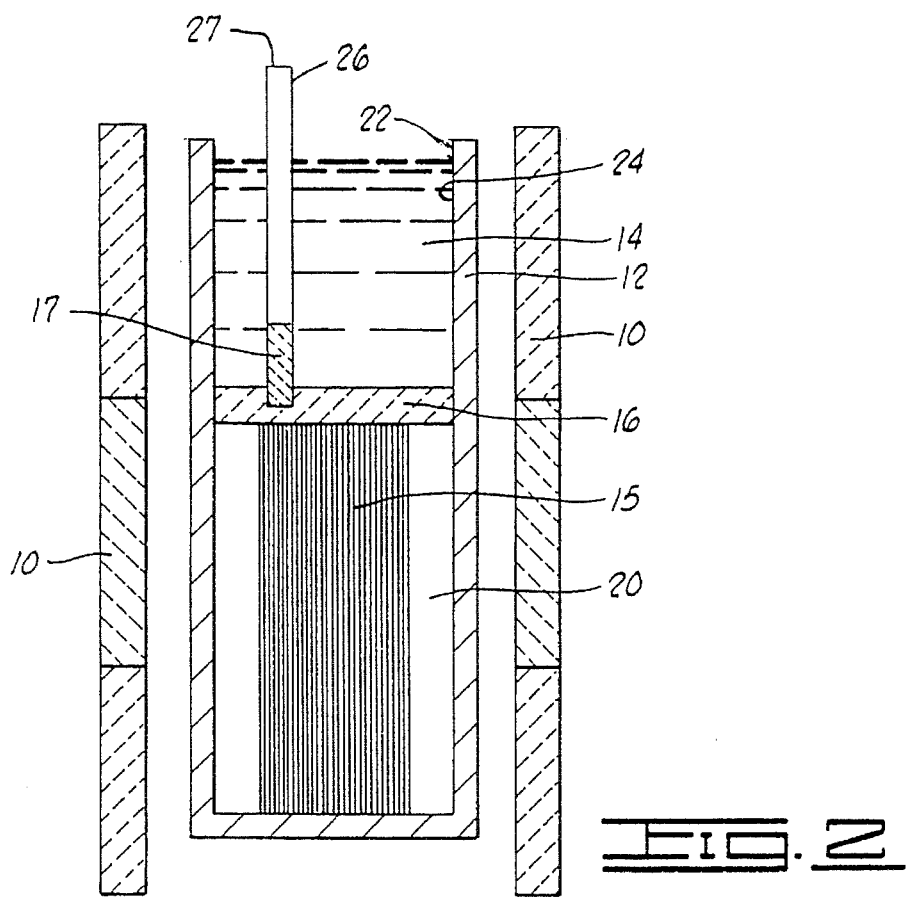
FIG. 2 is a schematic illustration in cross section showing the heating and evacuation of a preform and molten infiltrant in a vacuum furnace using a vent tube.

The preform and mold cavity can also be evacuated by positioning a vent tube in the molten infiltrant charge and in fluidic contact with the preform as schematically depicted in FIG. 2. In FIG. 2, vent tube 26 is positioned in filter 16 so that it terminates within filter 16. Vent tube plug 17 made of fiber can be made of the same or similar material as that used to make filter 16 and prevents molten infiltrant charge from entering vent tube 26 and from thence the vacuum apparatus. End 27 of vent tube 26 is connected to a vacuum apparatus not shown. Vent tube 26, which can be made of steel, quartz, alumina or any other gas impermeable material chemically compatible with the molten infiltrant and preform can be positioned at the top of preform 15 when the infiltrant charge 14 and preform 15 are being loaded in mold vessel 12 or can be positioned after infiltrant charge 14 is molten and preform 15 is preheated. Vent tube 26 is removed before transfer of preform 15 and molten infiltrant charge 14 into the pressure vessel.

Figure 15:
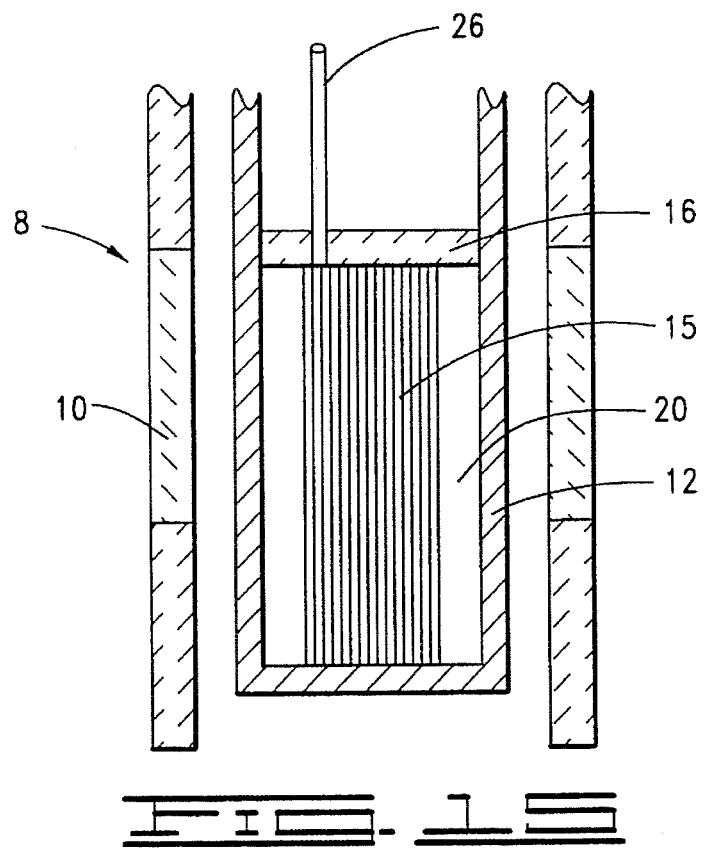
FIG. 15 is a schematic illustration in cross-section showing a separate preform heating vessel.
Figure 16:
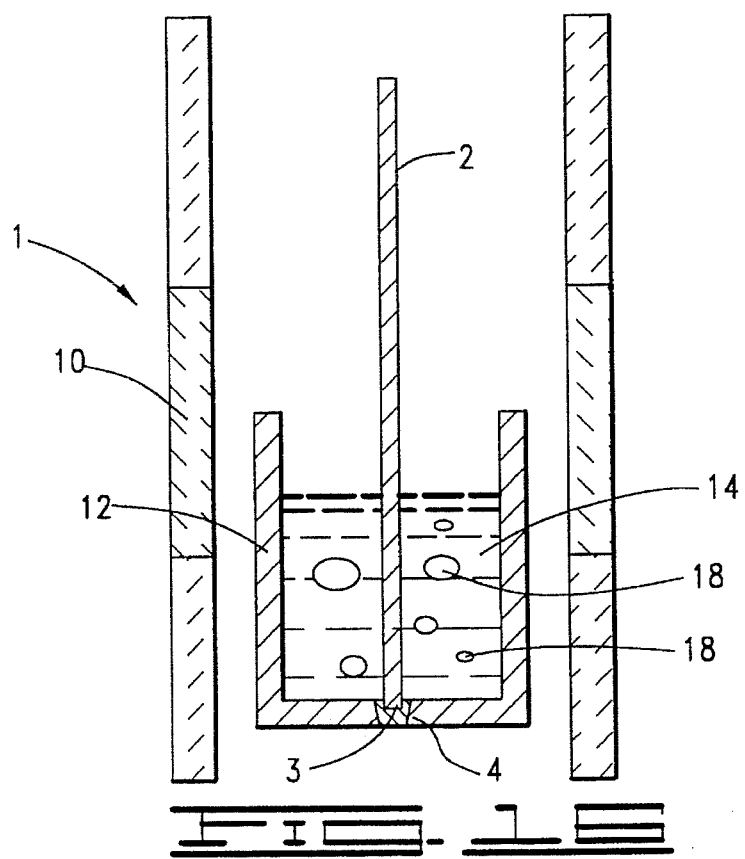
FIG. 16 is a schematic illustration in cross-section showing a separate infiltrant heating vessel.

According to another embodiment of the invention, the infiltrant charge and the preform are heated separately with the infiltrant charge being heated in an infiltrant heating vessel to form a molten infiltrant charge and the preform being heated in a preform heating vessel, which can include vacuum apparatus for evacuating the preform, to form a preheated preform. FIG. 15 is a schematic illustration of separate preform heating vessel 8 including furnace heating elements 10, preform 15, filter 16 vent tube 26,, mold cavity 20 and mold vessel 12. FIG. 16 is a schematic illustration of separate infiltrant heating vessel 1 including furnace heating elements 10, mold vessel 12, molten infiltrant 14 and gas bubbles 18. Drain rod 2 can be used to withdraw drain plug 3 from drain hole 4, thereby allowing decanting of infiltrant 14 into a mold vessel. The preheated preform and the molten infiltrant charge can be brought into contact, such as by introducing the molten infiltrant charge into the preform heating vessel and pouring the molten infiltrant into the preform which can include a vent tube, with optional evacuation of the infiltrant-containing preform before transfer of the preheated preform and molten infiltrant charge to the pressure vessel. The pressure vessel can be heated and can be in thermal contact with the preheated preform and the molten infiltrant charge so that the molten infiltrant charge remains liquid during the pressurizing step as shown schematically in FIG. 18 where pressure vessel 50 is heated by electric resistance heaters 53. Thermal contact between pressure vessel 50 and mold vessel 12 is provided by pressurizing gas introduced through pressurized gas inlet 54. Alternatively, the pressure vessel can be maintained at ambient temperature (i.e., the temperature of the environment outside the pressure infiltration casting apparatus), and the preheated preform and molten infiltrant charge kept insulated from the pressure vessel so that the molten infiltrant charge remains liquid through the pressurizing step (4).

Figure 3:
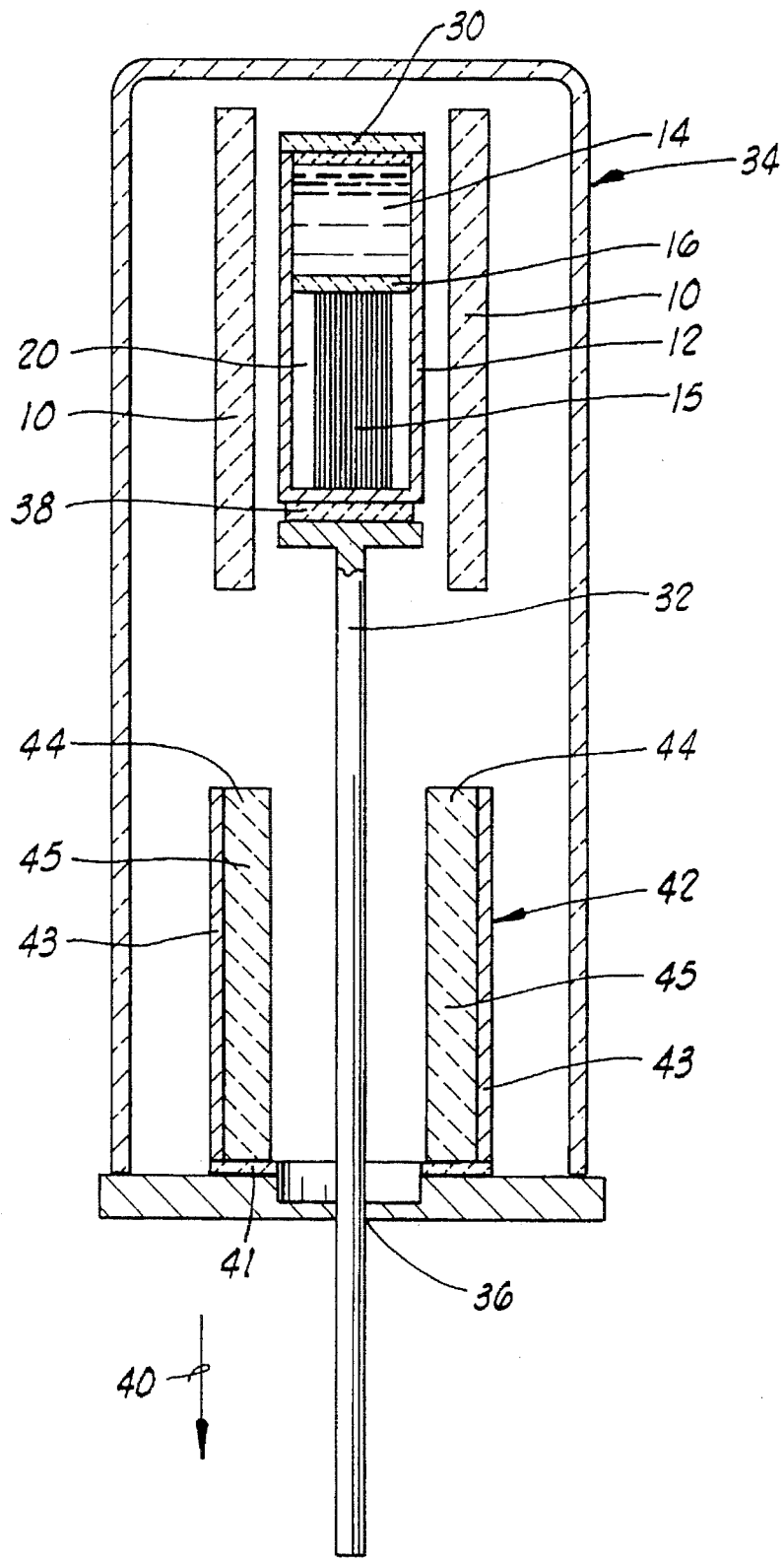
FIG. 3 is a schematic illustration in cross section showing a system for heating and evacuating a mold containing a preform and molten infiltrant including a transfer container for transferring the heated and evacuated mold to a pressure vessel.
Figure 4:
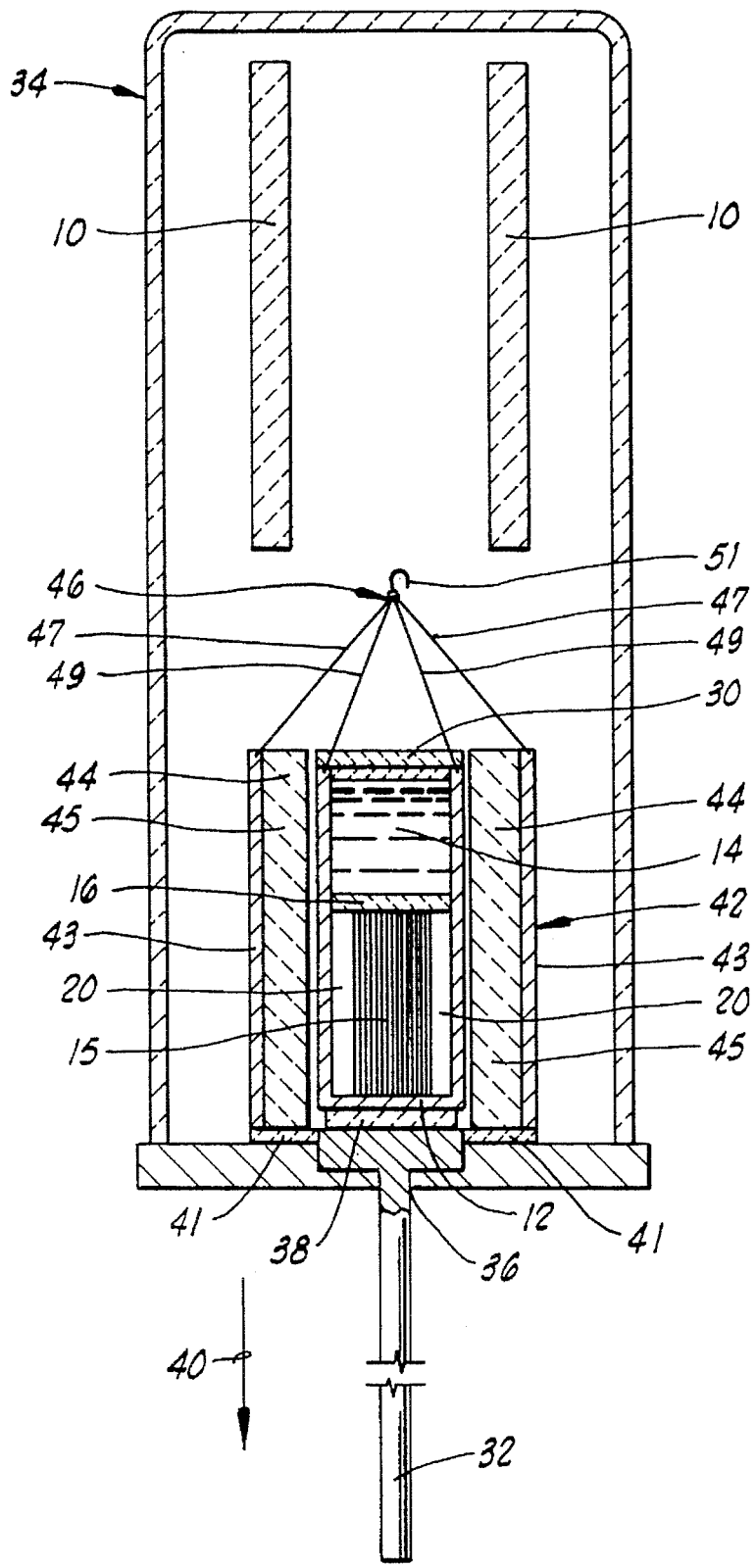
FIG. 4 is a schematic illustration in cross section showing a system for heating and evacuating a mold containing a preform and molten infiltrant including a transfer container for transferring the heated and evacuated mold to a pressure vessel.

As shown schematically in FIGS. 3 and 4, an insulated or heated transfer container can be provided for transferring the preheated preform and the molten infiltrant charge from the heating vessel to the pressure vessel so that the molten infiltrant charge remains molten and the preheated preform does not cool.

FIGS. 3 and 4 schematically depict the loading of a preevacuated, preheated preform and molten infiltrant charge into a transfer chamber for removal from a vacuum heating vessel and transfer to a pressure vessel.

In FIG. 3, preheated preform 15 is separated from molten infiltrant charge 14 by filter 16 within mold vessel 12 so that a vacuum is isolated in mold cavity 20 and preform 15. Mold vessel 12 is equipped with an insulating cap 30 which can be made of a refractory material fiber such as alumina fiber, Saffil™, Fiberfrax™ or zirconia wool and is positioned between furnace elements 10 to keep preheated preform 15 at an appropriate elevated temperature and retain molten infiltrant charge 14 in the molten state. Mold vessel 12 rests on hydraulic extractor 32 which is typically a steel rod which can be withdrawn from vacuum bell jar 34 at vacuum bell jar outlet 36. Mold vessel 12 is thermally insulated from hydraulic extractor 32 by insulator plate 38 typically made of alumina-silicate fiber such as Fiberfrax™ produced by Carborundum Co., spun-alumina staple fiber such as Saffil™ produced by ICI, Co. or zirconia wool. When hydraulic extractor 32 is moved downward in the direction given by arrow 40, mold vessel 12 can be positioned in mold transfer chamber 42 made of mold transfer chamber outer walls 43 typically constructed of a metal such as steel, approximately 0.030 inches thick, mold transfer chamber inner walls 44 typically constructed of an insulating material 45 such as alumina fiber Saffil™ Fiberfrax™ or zirconia wool approximately one inch thick and mold transfer chamber baseplate 41 constructed of alumina fiber, Saffil™, Fiberfrax™ or zirconia wool insulating material 0.5 inches thick. Alternatively, mold transfer container inner walls 44 can also include electric resistance heaters not shown constructed of an Fe-Cr alloy; Nichrome™, a Ni-Cr alloy material; Kanthal™, an FeCoAlY alloy, SiC, or SuperKanthal™, a MoSi$_2$ material to maintain the temperature of the preform and molten infiltrant charge at a temperature above the liquidus temperature of the infiltrant charge. The mold vessel can also be heated by induction.

FIG. 4 shows mold transfer container 42 equipped with a bail attachment and release mechanism 46, including primary suspension rods 47, secondary suspension rods 49 and bail primary suspension hook 51.

Figure 5:
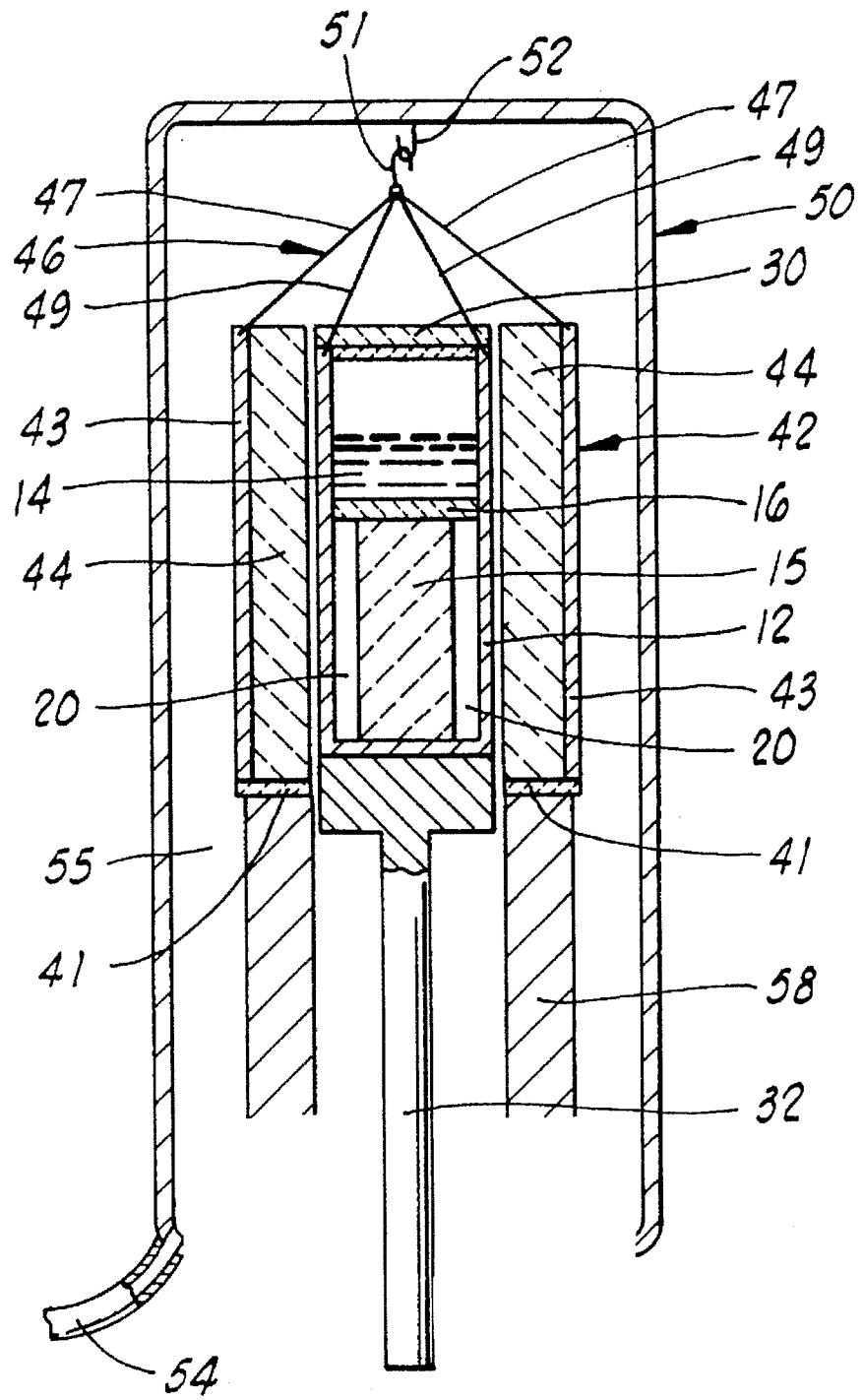
FIG. 5 is a schematic illustration in cross section showing pressure infiltration of a preheated, preevacuated preform in a pressure vessel.

After mold transfer container 42 has been removed from vacuum bell jar 34, mold transfer container 42 which maintains the temperature of the molten infiltrant charge and the preform at a desired level can be loaded into pressure vessel 50 and can be attached inside pressure vessel 50 to pressure vessel bail attachment hook 52 as shown schematically in FIG. 5. Insulator plate 38 remains attached to hydraulic extractor 32 so that in subsequent processing steps, the bottom of mold vessel 12 is not insulated. Pressure vessel 50 is typically constructed of a material such as steel or stainless steel.

A pressurized gas such as nitrogen, argon or helium is then introduced into pressure vessel 50 from a gas reservoir not shown through pressurized gas inlet 54, typically at a pressure in the range of from about 3 atm to about 1500 atm, more preferably in the range of from about 20 atm to about 500 atm, and most preferably in the range of from about 50 atm to about 150 atm which is sufficient to force molten infiltrant charge 14 into preform 15 sufficiently rapidly so that the process remains economically feasible. Since a vacuum was originally isolated in mold cavity 20, a pressure differential is created between the isolated vacuum in mold chamber 12 and interior 55 of pressure vessel 50 containing pressurized gas sufficient to cause molten infiltrant charge 14 to be forced through filter 16 to infiltrate preform 15 quite rapidly, in a time period which can vary from about a fraction of a minute to on the order of minutes.

Once infiltration of preform 15 by molten infiltrant charge 14 has proceeded to the desired extent as evidenced by processing experience and calculations as well known to one skilled in the art, hydraulic extractor 32 is moved so that it comes into contact with the bottom of mold vessel 12. Then, bail attachment and release mechanism 46 is released so that mold vessel 12 can be lowered into chill zone 58 or onto a chill plate not shown. In yet another embodiment, not shown, extractor 32 can be water-cooled so that it provides the required solidification gradient when in thermal contact with mold vessel 12.

Figure 6:
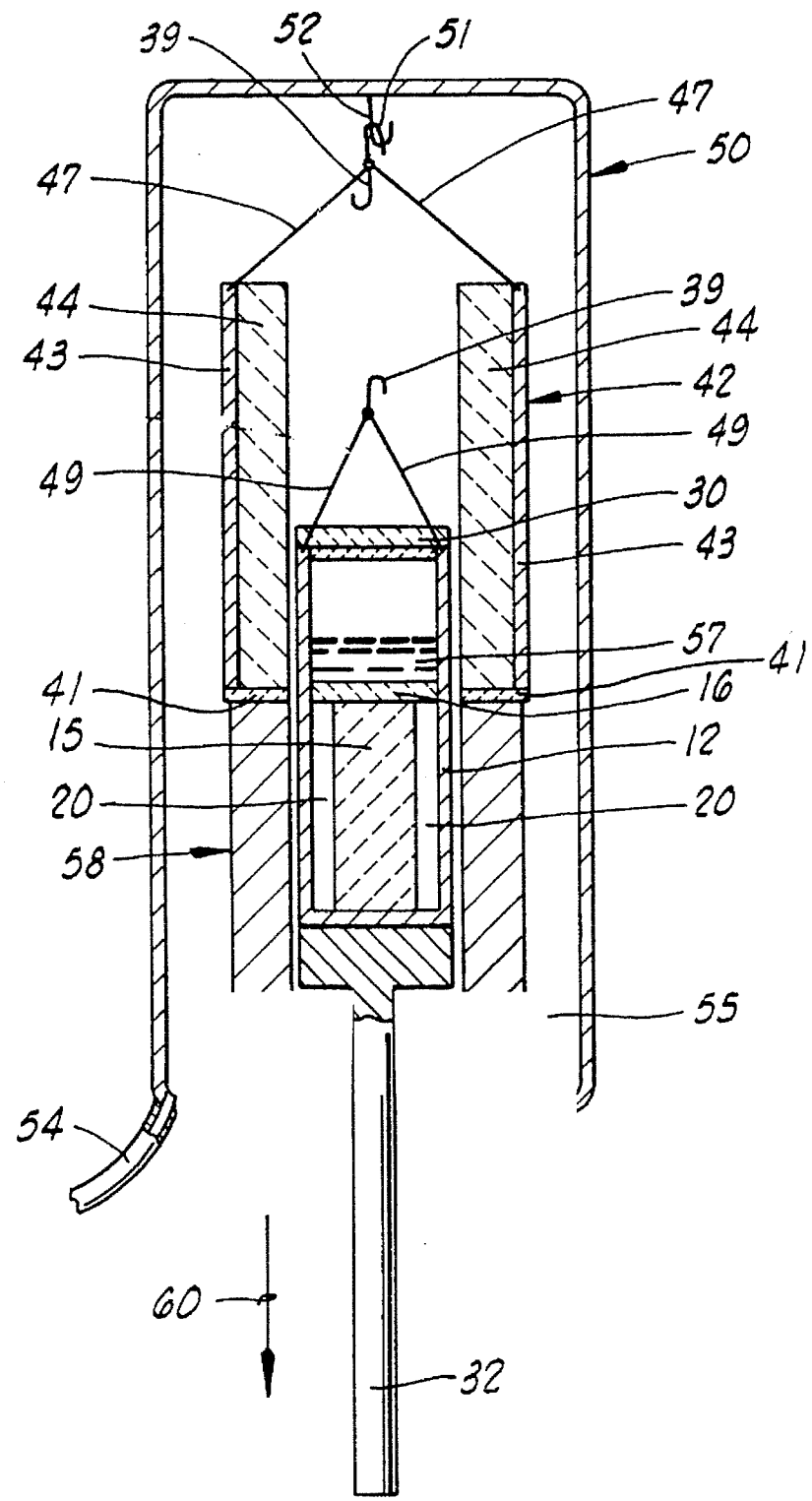
FIG. 6 is a schematic illustration in cross section showing cooling of an infiltrated preform in a pressure vessel.

Excess molten infiltrant charge which does not enter preform 15 forms "hot top" 57 above preform 15 as shown in FIG. 6. "Hot top" 57 insures the proper temperature gradient such that metal shrinkage due to solidification is continuously replenished from the pool of molten metal in the "hot top" 57. With shrinkage thus fed, shrinkage porosity within the preform cavity is eliminated. The solidification gradient is selected and maintained so that shrinkage porosity is eliminated. The presence of "hot top" 57 provides the required thermal gradient to initiate directional solidification of infiltrated preform 15 as mold vessel 12 is lowered into chill zone 58 as extractor mechanism 32 is moved downward in the direction given by arrow 60 so that secondary suspension rods 49 are disengaged from primary suspension rods 47 at bail secondary suspension hook 39.

Chill zone 58 can be constructed from hydraulically cooled metal plates in thermal contact with mold vessel 12 and refers to the section of pressure vessel 50 where directional solidification of the infiltrated preform occurs. Typical pressures maintained in the pressure vessel during infiltrated preform solidification are in the range of from about 50 atm to about 125 atm. Typical temperature gradients used to achieve directional solidification of infiltrated preform 15 are in the range of from about 550° C. to about 650° C. for aluminum alloys. Alternatively, chill zone 58 can include heaters which can be adjusted to control chill temperature and to achieve a selected solidification rate in infiltrated preform 15 as determined by considering the following characteristics of the material being solidified: interfiber spacing within preform 15, infiltrant solidus temperature and infiltrant liquidus temperature.

Also, solidification can be conducted in a chill vessel having any or all of the chill zone components already described which is separate from the pressure vessel.

Solidification can also be conducted by flowing a gas around the infiltrated preform. The gas can be the same gas as used to drive the infiltrant into the preform when gas pressure is at a level sufficient to cause infiltration.

The pressure infiltration casting apparatus of the invention provides a separate heating vessel to heat a preform and an infiltrant charge to produce a preheated preform and a molten infiltrant charge, a separate pressure vessel to infiltrate the preform with a molten infiltrant charge to produce an infiltrated preform, a transfer chamber to hold the preheated preform and molten infiltrant charge during transfer from the heating vessel to the pressure vessel and a cooler to cool the infiltrated preform to form a finished article. In a preferred embodiment of the apparatus, the heating vessel also includes vacuum equipment to evacuate the heating vessel and remove trapped gas from the preform and the molten infiltrant charge.

In another preferred embodiment, the heating vessel contains a selected atmosphere which can be an inert gas such as argon, nitrogen or helium or a reducing gas, if the infiltrant charge is copper or steel, or ambient atmosphere (air). In this embodiment, a vacuum vessel is provided to evacuate the preheated preform and molten infiltrant charge to remove any gases which are trapped within the preheated preform and molten infiltrant.

The vacuum vessel can include heaters and be in thermal contact with the mold vessel containing the preheated preform and molten infiltrant. Alternatively the vacuum vessel can be unheated and can be insulated from the mold vessel containing the preheated preform and molten infiltrant charge. The vacuum vessel can include a vent tube which is inserted near a surface of the preform so that the vent tube is in fluidic contact with the preform. A plug of refractory fibrous material can be inserted in the vent tube to prevent molten infiltrant charge from being drawn up into the vacuum equipment during evacuation of the preform. The vent tube can be connected to the vacuum equipment for removal of trapped gases from within the preheated preform and molten infiltrant charge. The vent tube can be constructed from materials such as, but not restricted to, steel, ceramics such as alumina, mullite or zirconia, quartz or glass. A vacuum in the range of from about 1 µm Hg to about 1 mm Hg is usually sufficient for evacuation of the preheated preform and molten infiltrant charge.

Optionally, the infiltrant charge can be held in a container within the heating vessel and the molten infiltrant charge can be poured from the container into the preheated preform.

In another embodiment, separate preform and infiltrant heating vessels are provided and the preform heating vessel can further include vacuum equipment to evacuate the preform.

The pressure vessel can be provided with a heating device to heat the preheated preform and keep the molten infiltrant charge in a liquid state. The pressure vessel can alternatively, be kept at ambient temperature and provided with insulation to insulate the pressure vessel from the preheated preform and molten infiltrant charge. The pressure vessel is provided with a gas inlet for introduction of pressurized gas for infiltration and is constructed from material such as steel to withstand gas pressures in the range of from about 1 atm to about 1500 atm, more preferably in the range of from about 20 atm to about 500 atm, and most preferably in the range of from about 50 atm to about 150 atm. Approximately 1 atm to about 5 atm of pressure are sufficient for infiltration of unreinforced castings and for filling complex molds including fine details.

A transfer chamber is provided to transfer the preheated preform and molten infiltrant from the heating vessel to the pressure vessel and can include insulation to prevent the preheated preform and molten infiltrant charge from cooling during transfer from the heating vessel to the pressure vessel or can be equipped with an electrical resistance heater to maintain the preheated preform and molten infiltrant charge at a desired temperature.

The transfer chamber can be constructed as a bail transfer chamber including a mold vessel holding chamber to contain the mold vessel, a heating vessel suspension member, a pressure vessel suspension member, primary suspension rods connected to the mold vessel chamber to detachably suspend the mold vessel holding chamber from the heating vessel and pressure vessel suspension members, and secondary suspension rods connected to the mold vessel to detachably suspend the mold vessel from the primary suspension members as shown in FIG. 6.

Figure 7:
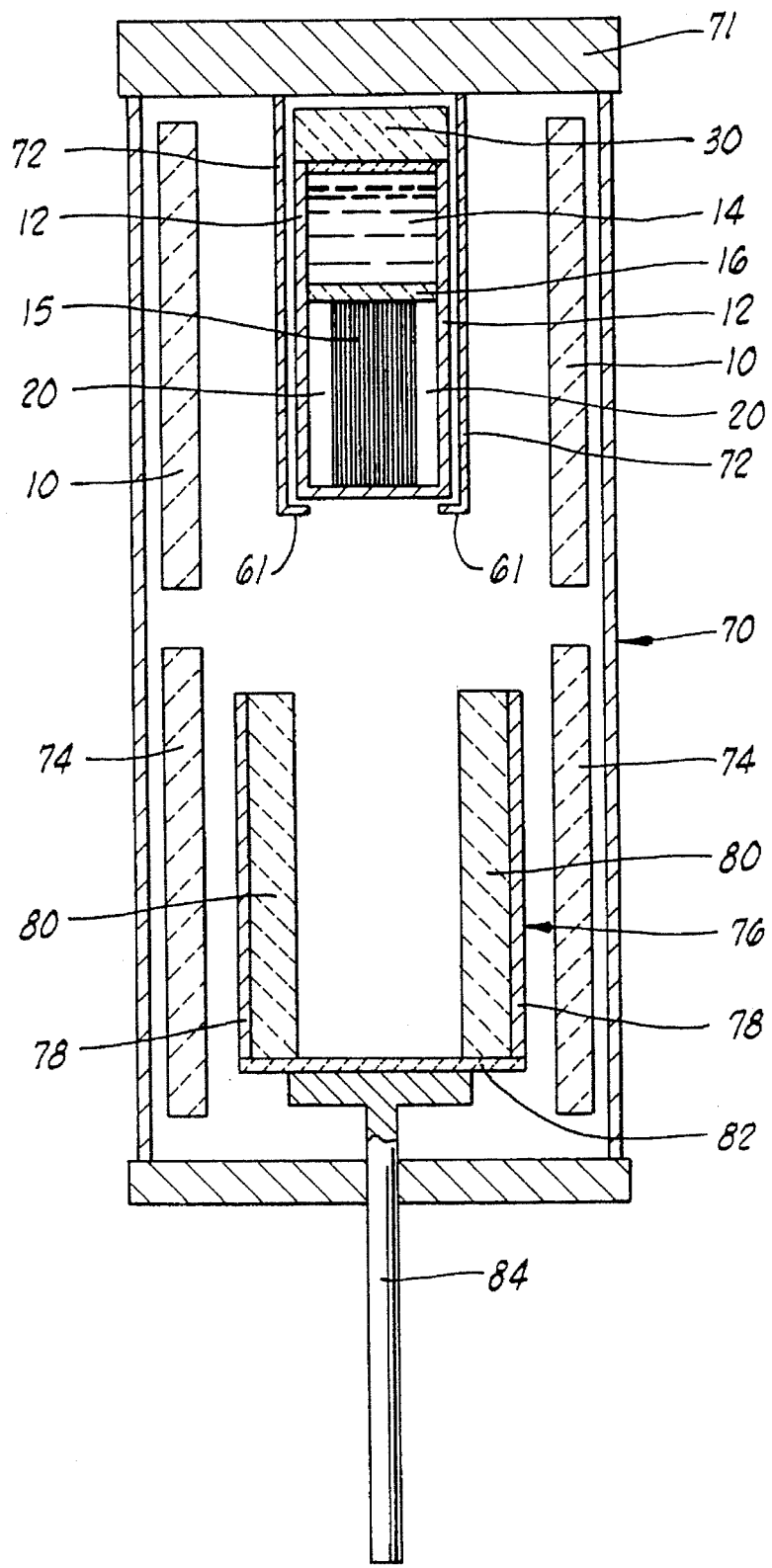
FIG. 7 is a schematic illustration in cross section showing a heated and evacuated mold containing a preform and molten infiltrant held within a vacuum furnace.

Alternatively, the transfer chamber can be a common transfer head transfer chamber as shown in FIG. 7. A common transfer head mold transfer chamber can be used to transfer the preheated, preevacuated preform and molten infiltrant charge from the heating or vacuum heating vessel to the pressure infiltration vessel as shown schematically in FIGS. 7–10 and can be insulated or include heaters to maintain the preheated preform and molten infiltrant charge at a desired temperature.

FIG. 7 shows vacuum heating vessel 70 which contains mold vessel 12 suspended from transfer cap 71, which can contain instrumentation including thermocouples and pressure gauges, by common transfer head suspension chamber 72 and be made of metal or insulating material. Common transfer head suspension chamber 72 includes support members 61 which suspend mold vessel 12 during heating and/or evacuation and can be rods or bars which can be rotated out of the way as common transfer head mold transfer chamber 76 is raised to allow mold vessel 12 to slide into transfer chamber 76. Mold vessel 12 contains preform 15 separated by filter 16 from infiltrant charge 14 and is covered by insulator cap 30. Common transfer head suspension chamber 72 holds mold vessel 12 and its contents within a space enclosed by multizone furnace elements 10 which preheat preform 15 and melt infiltrant charge 14 so that it becomes a molten infiltrant charge.

Once vacuum heating vessel 70 is evacuated, preform 15 is evacuated and a vacuum is isolated in mold vessel cavity 20. Vacuum heating vessel 70 also includes preheat furnace elements 74 for preheating common transfer head mold transfer chamber 76.

Common transfer head mold transfer chamber 76 includes common transfer head mold transfer chamber outer walls 78 which are typically made from a metal such as steel or stainless steel capable of withstanding casting processing temperatures typically in the range of from about 660° C. to about 750° C. and common transfer head mold transfer chamber inner walls 80 which can be constructed from an insulating material such as alumina fiber, Fiberfrax™, Saffil™ or zirconia wool having adequate insulating properties to maintain the preheated preform molten infiltrant charge at a temperature above the liquidus of the infiltrant charge and are typically in the range of from about 0.5 inch to about 2 inches thick. Chamber inner walls 80 can also include heaters to maintain preheated preform 15 and molten infiltrant charge 14 at a desired temperature.

Common transfer head mold transfer chamber baseplate 82 is typically constructed from a material such as steel or stainless steel and is mounted on hydraulic common transfer head mold transfer chamber transfer rod 84. Transfer chamber baseplate 82 can be removably mounted on transfer rod 84 in any manner known to one skilled in the art including having one or more pins protrude from the bottom of transfer chamber baseplate 82 which are inserted into mating holes in transfer rod top 83 when transfer chamber baseplate 82 is attached to transfer rod top 83. When transfer chamber baseplate 82 is attached to transfer rod top 83, transfer rod 84 can be used to lift common transfer head mold transfer chamber 76 in the direction given by arrow 86 as shown in FIG. 8 so that common transfer head mold transfer chamber 76 engages common transfer head suspension chamber 72 using a bayonet mechanism whereby outer bayonet mechanism slots 73 engage mating support tabs on transfer chamber baseplate 82 when transfer rod 84 is appropriately rotated by 60° in the direction given by arrow 87.

Figure 8:
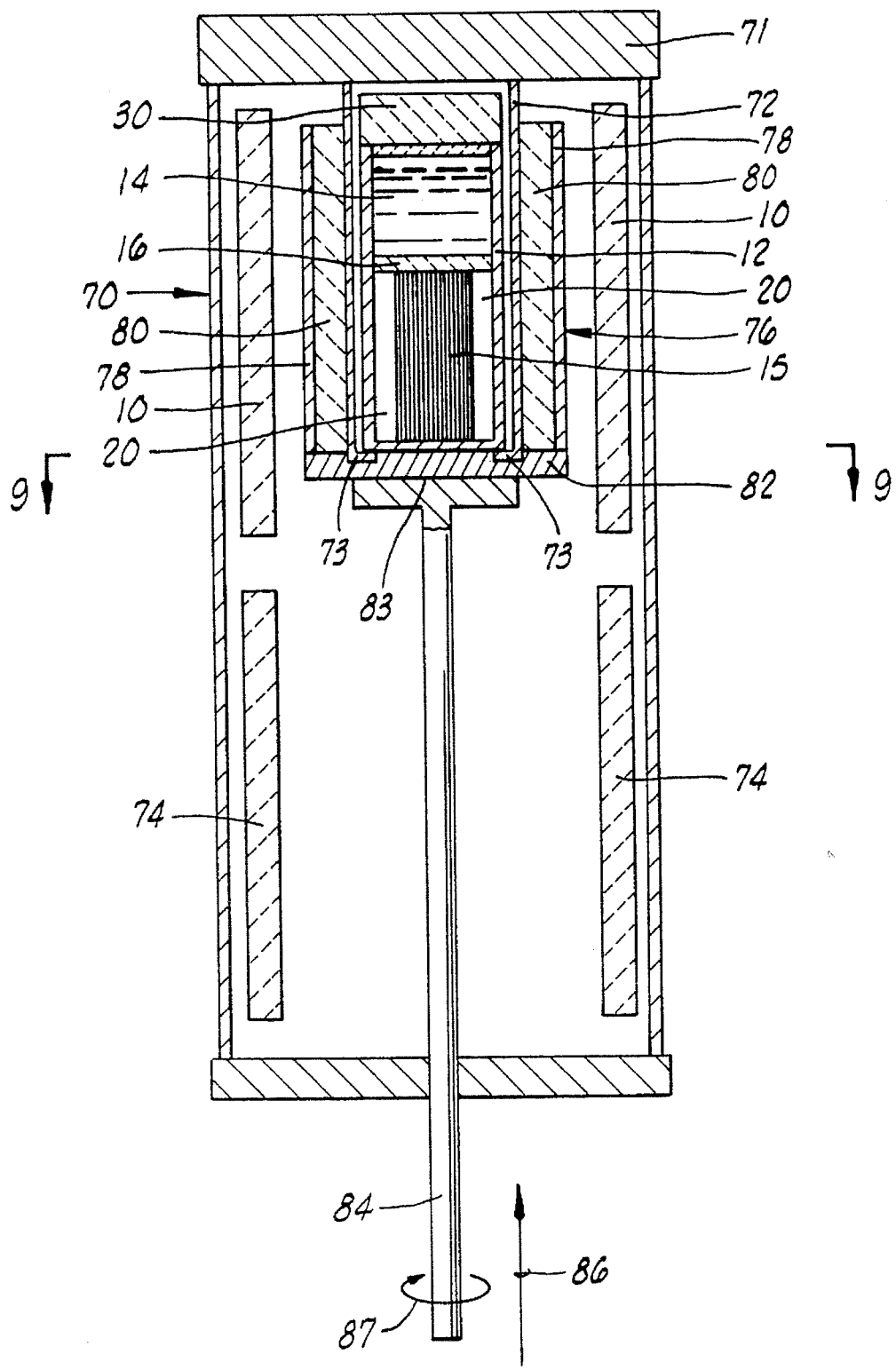
FIG. 8 is a schematic illustration in cross section of a mold containing a preheated, preevacuated preform and molten infiltrant being prepared for transfer from a vacuum furnace to a pressure vessel.

FIG. 9 show a view of bayonet mechanism 91 taken along line 9—9 of FIG. 8. In FIG. 9, bayonet mechanism 91 is shown in the engaged position when support tabs 85 which are machined into transfer chamber baseplate 82 are rotated so that they are displaced from outer bayonet mechanism attachment slots 73. When bayonet mechanism 91 is in the engaged configuration as shown in FIG. 9, transfer chamber baseplate 82 is connected with common transfer head suspension chamber 72. Transfer rod 84 can be rotated by 60° so that slots 73 and tabs 85 are aligned thereby disengaging transfer chamber baseplate 82 from common transfer head suspension chamber 72.

Mold transfer chamber 76 maintains molten infiltrant charge 14 and preheated preform 15 at a desired temperature until preheated preform 15 is infiltrated with molten infiltrant charge 14 by application of pressure.

Figure 10:
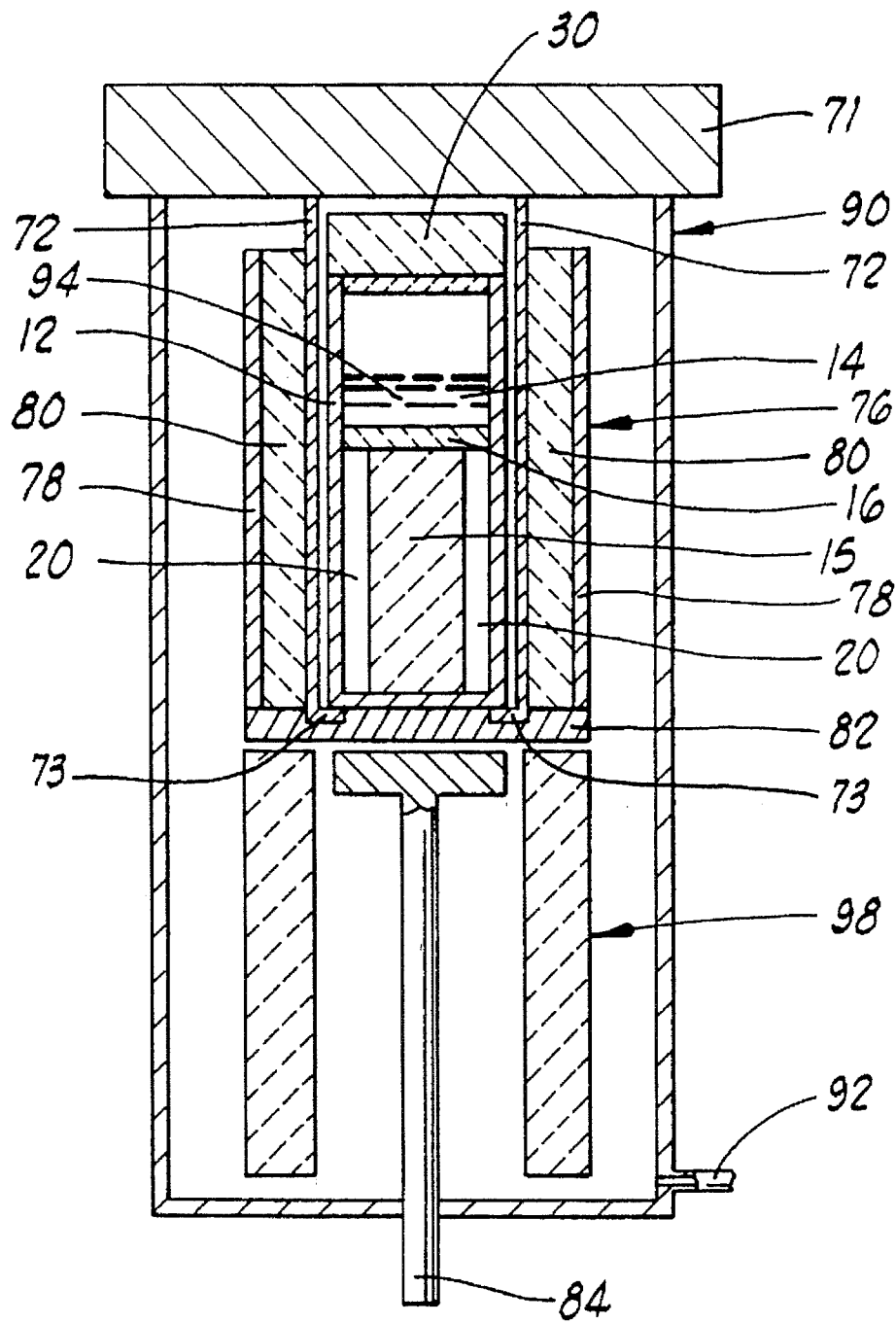
FIG. 10 is a schematic illustration in cross section showing pressure infiltration of a preheated, preevacuated preform in a pressure vessel.

Using hydraulic common transfer head mold transfer chamber transfer rod 84, common transfer head mold transfer chamber 76 enclosing common transfer head suspension chamber 72 and mold vessel 12 can be transferred to pressure vessel 90 as shown in FIG. 10 where common transfer head mold transfer chamber 76 is engaged with common transfer head suspension chamber 72 whereupon transfer rod 84 can be disengaged from common transfer head mold transfer chamber baseplate 82. Pressurization gas such as nitrogen at a pressure of typically 100 atm can be introduced into pressure vessel 90 through pressurization gas inlet 92 from a pressurization gas reservoir not shown to create a pressure differential between the pressure inside pressure vessel 90 and that in mold cavity 20 wherein a vacuum has been isolated by evacuating mold vessel 12 in vacuum heating chamber 70 resulting in infiltration of preheated preform 15 with molten infiltrant charge 14.

The quantity of the metal charge is calculated so that the proper amount of molten charge remains as hot top 94 after preform 15 and mold cavity 20 have been completely infiltrated. Most preforms that have been preheated to a temperature near to the liquidus temperature of the molten infiltrant charge are infiltrated in a period of time typically less than one minute.

Once infiltration has proceeded to the desired level, leaving an appropriate amount of residual molten infiltrant charge 14 to produce "hot top" 94, hydraulic common transfer head mold transfer chamber transfer rod 84 which can be water-cooled once again can be engaged with transfer chamber baseplate 82 so that transfer rod 84 is in thermal contact with mold vessel 12 and infiltrated preform 15 so that an appropriate temperature gradient for directional solidification is established.

Figure 11:
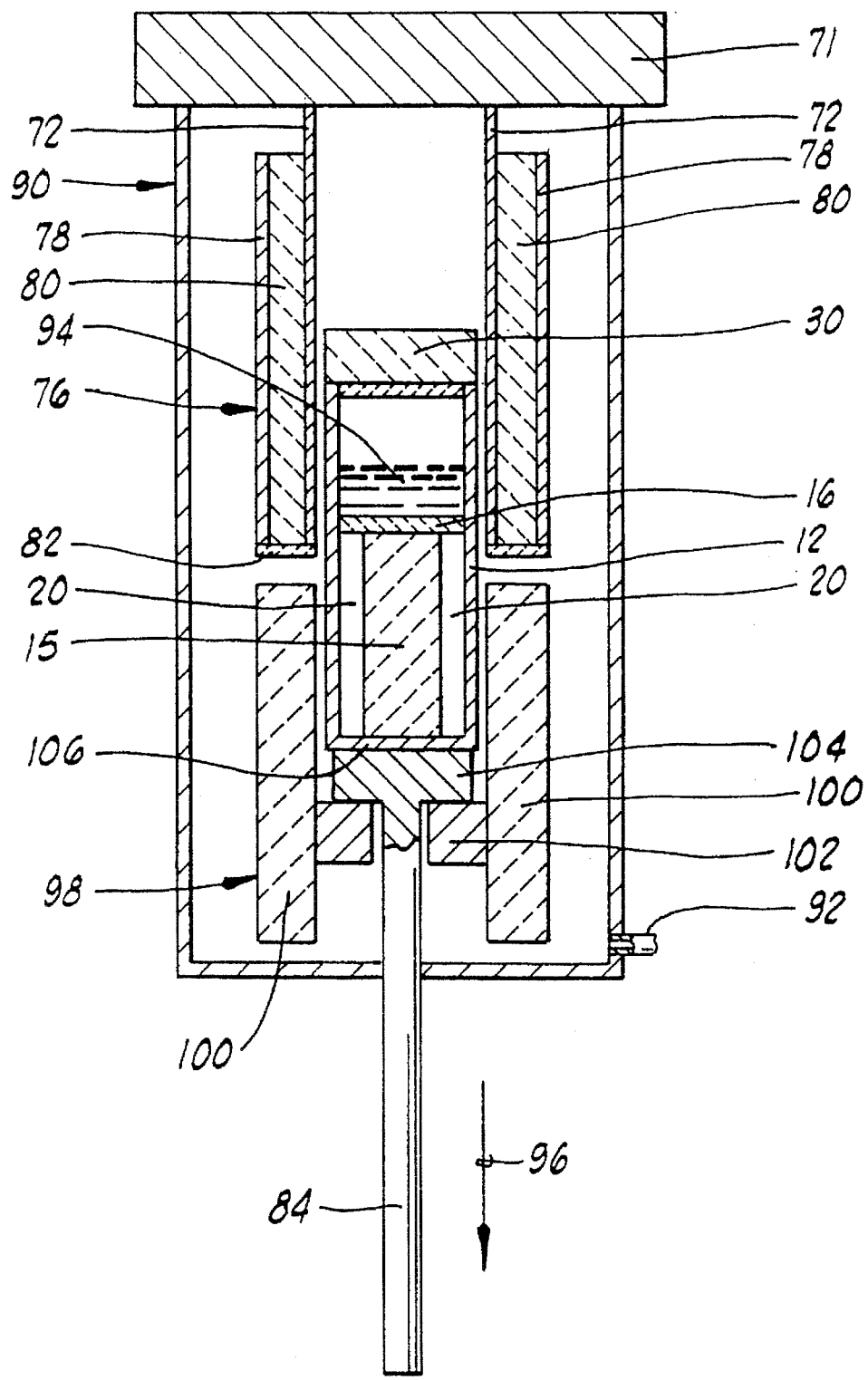
FIG. 11 is a schematic illustration in cross section showing cooling of an infiltrated preform in a pressure vessel.

Alternatively, as shown in FIG. 11, mold vessel 12 containing infiltrated preform 15, filter 16 and "hot top" 94 can be released from common transfer head suspension chamber 72 such as by moving away support members not shown in such a way as to keep transfer chamber 76 suspended from transfer cap 71 by common transfer head suspension chamber 72. Mold vessel 12 is then withdrawn in the direction given by arrow 96 into chill zone 98 so that directional solidification of infiltrated preform 15 can occur as shown in FIG. 11.

Chill zone 98 can be constructed from chill plates 100 made from highly thermally conductive material such as metals like copper, molybdenum, tungsten, or steel or non-metals such as graphite. Chill plates 100 can be optionally provided with internal fluid circulation channels not shown so that a cooled fluid can be continuously circulated through chill plates 100 to maintain chill plates 100 at a selected temperature and continually carry away the heat of solidification from solidifying infiltrated preform 15. Chill plates 100 can also be provided with a cooling chamber heater not shown which can be used to control the temperature of chill zone 98 and produce a controlled, selected solidification rate. A lower chill baseplate 102 is attached to and in thermal contact with transfer rod support 104 which allows heat transfer from mold vessel base 106. Lower chill baseplate 102 can be water-cooled. Lower chill baseplate 102 can be used alone or together with chill plates 100, depending upon the desired temperature gradient for solidification. Lower chill baseplate 102 can be connected to transfer rod 84 and be in thermal contact therewith. The chill baseplate 102 can be brought into contact with the infiltrated preform either by raising the chill baseplate 102 up to the infiltrated preform or by lowering the infiltrated preform onto chill baseplate 102. Also, transfer rod 84 can be watercooled.

In another embodiment, solidification is carried out in a chill vessel, separate from the pressure vessel and equipped with the already-described components of chill zone 98. FIG. 17 is a schematic illustration of separate chill vessel 97 including transfer cap 71, chill zone 98, chill plates 100, transfer rod 84, and gas inlet 92. Solidification of the infiltrated preform can also be conducted by chilling the infiltrated preform on a chill plate exterior to the pressure vessel.

Figure 12:
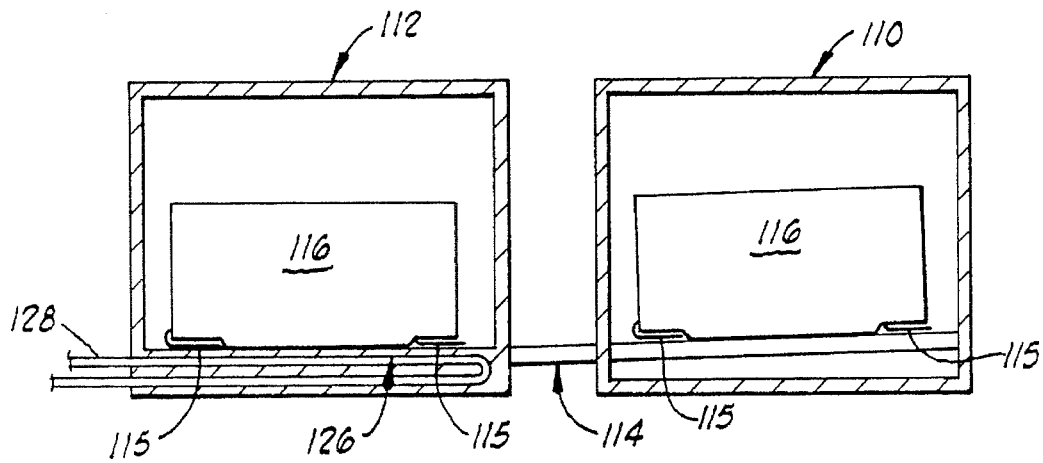
FIG. 12 is a schematic illustration showing the interior of a pressure vessel and of a heating vessel including a mold vessel.

In another preferred embodiment, as shown schematically in FIG. 12, heating vessel 110, which can be a vacuum or controlled atmosphere furnace, and separate pressure vessel 112 are arranged in a horizontal configuration and are connected to each other by rail transfer system 114. Rail transfer system 114 allows transfer of mold vessel 116 from heating vessel 110 to pressure vessel 112 in a continuous fashion and allows for a continuous high volume cycling of mold vessels and preforms through a pressure infiltration process.

Mold vessel 116 contains a mold, a preform and molten infiltrant charge and serves as a transfer chamber for transfer of the mold and preform from heating vessel 110 to pressure vessel 112 and moves along, rail transfer system 114 on shoes 115. Mold vessel 116 can be preheated and preevacuated in heating vessel 110, optionally using one or more vent tubes not shown for evacuation. Once evacuation is complete, any vent tubes are removed and mold vessel 116 is transferred from heating vessel 110 to pressure vessel 112 using rail transfer system 114.

Figure 13:
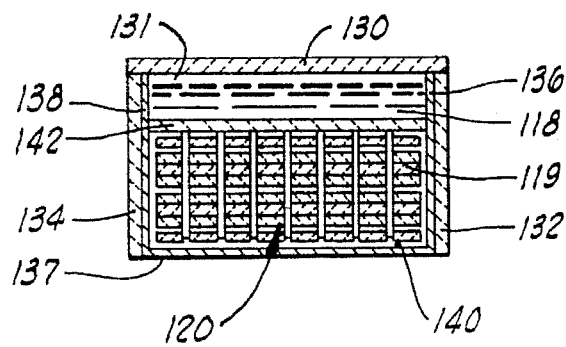
FIG. 13 is a schematic illustration in cross section showing the interior of the mold vessel shown in FIG. 12.

Once mold vessel 116 is introduced into pressure vessel 112, pressurized gas is introduced into pressure vessel 112 so that molten infiltrant 118, contained within mold vessel 116 as shown in the schematic interior view of mold vessel 116 of FIG. 13, infiltrates preform 119 also contained within mold vessel 116 and shown in FIG. 12. After infiltration is complete, mold vessel 116 is brought into contact with chill block 126 which is water cooled by water circulation apparatus 128. Since chill block 126 is in contact with an entire side of mold vessel heat transfer is efficient.

Mold vessel 116 can be brought into contact with chill block 126 contained in pressure vessel 112 in several ways to solidify the infiltrated preform. Mold vessel 116 can be slid off rail transfer system 114 onto chill block 126 by providing a downgrade from heating vessel 110 and pushing mold vessel 116 off the rail transfer system 114 and onto chill block 126. Also, chill block 126 can be raised thereby lifting mold vessel 116 off rail system 114 to bring it into contact with mold vessel 116. Alternatively, mold vessel 116 can be in contact with chill block 126 from the beginning of the infiltration process and infiltrated with the molten infiltrant charge while in thermal contact with chill block 126.

FIG. 13 is a schematic cross-sectional representation of the interior of mold vessel 116 during the heating and evacuation step and shows insulated mold vessel outer walls 130, 132 and 134 including upper insulating layer 131 surrounding thermally conductive mold vessel inner walls 136, 137 and 138 which can be steel. Mold vessel 116 is constructed so that its walls are thermally conductive and the mold vessel is gas impermeable. A fibrous layer 140 can be positioned between vessel inner wall 137 and mold 120 and can be made of the same fibrous insulating material as filter 142. During heating in heating vessel 110 and prior to infiltration in pressure vessel 112, fibrous layer 140 acts as an insulator. During infiltration, fibrous layer 140 is also infiltrated with molten infiltrant 118 and, thus, is made thermally conductive if molten infiltrant 118 is a metal or other thermally conductive material. Once infiltrated, fibrous layer 140 allows heat transfer between mold 120 and chill block 126.

Figure 14:
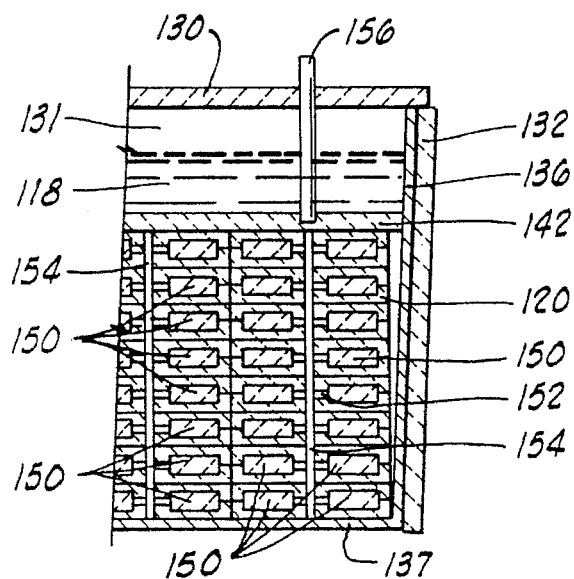
FIG. 14 is a schematic illustration in cross section showing an enlarged view of a part of the interior of a mold vessel such as the mold vessel shown in FIG. 13.

FIG. 14 is an expanded cross-sectional, schematic view of a section of the mold vessel interior shown schematically in FIG. 13 and additionally shows preforms 150 contained within mold 120 fed with molten infiltrant through preform gates 152 from sprues 154. Vacuum vent tube 156 is embedded within filter 142 for evacuating mold 120 and preforms 150. Multiple vacuum vent tubes can also be provided.

It is emphasized that all of the foregoing methods and apparatus can be used to produce an unreinforced casting by eliminating the preform and, instead, using an empty mold cavity having the shape of the desired casting.

In order to further illustrate the method and apparatus of the present invention, the following Examples are provided. The particular processing conditions and design details of the apparatus utilized in the Examples are meant to be illustrative of the present invention and not limiting thereto.

EXAMPLE 1

The following Example is provided to show how a preform can be preevacuated before being infiltrated to result in production of a finished composite article without any porosity due to residual gas in the preform.

A 1.5 inch diameter quartz mold vessel was loaded with a SiC powder preform which filled the bottom four inches of the quartz mold vessel. A filter material such as any of those already described was placed on top of the SiC powder preform and a solid infiltrant charge of solid aluminum was placed above the filter material.

The loaded mold vessel was then heated in an inert atmosphere such as any of those inert gas atmospheres already described until the solid aluminum solid infiltrant charge melted to form a molten infiltrant charge of molten aluminum and the SiC powder preform was preheated to the aluminum infiltrant charge liquidus temperature.

The mold vessel containing the molten aluminum molten infiltrant charge and the preheated SiC powder preform was then evacuated to cause any gas entrapped in the SiC powder perform to be removed by bubbling through the molten aluminum molten infiltrant charge. Evacuation was carried out for approximately 10 minutes.

After mold vessel evacuation was complete, the vessel containing the quartz vessel was pressurized to cause the molten aluminum molten infiltrant charge to infiltrate the preform.

After infiltration was completed to the desired level, the infiltrated preform was solidified to produce a finished casting.

The casting was inspected for porosity and completeness of infiltration and was found to be sound and completely infiltrated with no evidence of residual gas porosity indicating that any entrapped gas had been completely removed during the evacuation step conducted prior to infiltration.

EXAMPLE 2

The following Example is provided to show how a vent tube can be used to evacuate a preform during an evacuation step of a pressure infiltration process to produce a finished article which shows no evidence of porosity due to residual trapped gas.

A quartz mold vessel was loaded with a SiC 600 grit powder preform. A filter made up of a 0.75 inch thickness of Fiberfrax™ material was placed on top of the SiC powder preform. A quartz vent tube (having 6 mm i.e. 0.25 inch inner diameter) was inserted into the filter material so that its end nearest the preform surface was approximately 0.25 inch from the preform surface as schematically shown in FIG. 2. The other end of the quartz tube was connected to a vacuum. The quartz vent tube was packed with a 0.5 inch plug, also of Fiberfrax™ material, to prevent molten infiltrant charge from being pulled up through the tube and into the vacuum pump during subsequent evacuation steps. A solid aluminum solid infiltrant charge was placed above the filter and around the quartz vent tube.

The loaded mold was then heated in an argon atmosphere to a temperature above the liquidus temperature of the aluminum solid infiltrant charge.

After the solid aluminum solid infiltrant charge was fully melted to form a liquid aluminum molten infiltrant charge, the quartz vent tube was opened to vacuum using a valve so that the preform and mold vessel were evacuated. After evacuation of the preform and mold vessel through the vent tube for approximately 10 minutes, the vent tube was manually removed from the preform and mold vessel.

The preheated preform and molten infiltrant charge were then pressurized by exposure to an 800 psi nitrogen atmosphere to achieve complete infiltration of the SiC powder preform. The infiltrated preform was solidified to produce a finished casting.

Examination of the finished casting showed that the SiC powder preform had been completely infiltrated and showed no evidence of porosity due to any residual trapped gas.

What is claimed is:

1. A method for pressure infiltration casting comprising:
   (1) providing a mold cavity and an infiltrant charge;
   (2) preheating said mold cavity and said infiltrant charge in a heating vessel to form a preheated mold cavity and molten infiltrant charge;
   (3) positioning a vent tube in fluidic contact with said preheated mold cavity;
   (4) providing a pressure vessel separated from and unconnected with said heating vessel and transferring said preheated mold cavity and said molten infiltrant charge to said pressure vessel and removing said vent tube before transferring said preheated mold cavity and said molten infiltrant charge from said heating vessel to said pressure vessel;
   (5) pressurizing said pressure vessel by introduction of a pressurized gas so that said molten infiltrant charge fills said preheated mold cavity to form a filled mold cavity; and
   (6) cooling said filled mold cavity so that said molten infiltrant charge solidifies to form a finished article.

2. The method of claim 1 wherein said infiltrant charge is a metal selected from the group consisting of aluminum, silicon, magnesium, nickel, zinc, copper, iron, tin, silver, gold, platinum, rhodium, silicon, titanium, chromium, cobalt, vanadium, niobium, molybdenum and zirconium and alloys thereof.

3. The method of claim 1 wherein said infiltrant charge is an intermetallic compound selected from the group consisting of NiAl, $Ni_3Al$, TiAl, FeAl, $Fe_3Al$, CoAl and $Co_3Al$.

4. The method of claim 1 wherein said vent tube is positioned during said step (1).

5. The method of claim 1 wherein said vent tube is positioned after said step (2).

6. The method of claim 1 wherein step (6), of cooling said mold cavity wherein said mold cavity is further characterized by a mold cavity bottom, further includes flowing a gas to contact said mold cavity bottom so that said molten infiltrant solidifies at a selected solidification rate.

7. The method of claim 1 further including a step of providing a preform, loading said preform and said infiltrant charge in said mold cavity and before step (2) of preheating, positioning said vent tube in fluidic contact with said preform.

8. The method of claim 1 wherein said vent tube is connected to vacuum.

9. The method of claim 1 wherein said mold cavity further includes a preform which can be infiltrated in step (5) to form an infiltrated preform.

10. The method of claim 9 wherein said molten infiltrant is positioned above said preform and flows into said preform.

11. The method of claim 9 wherein said preform and said molten infiltrant charge contain trapped gas and step (2) of preheating said preform and infiltrant charge further includes a step of evacuating said heating vessel to remove said trapped gas from said preform and said molten infiltrant charge.

12. The method of claim 9 wherein said pressure vessel is heated and is in thermal contact with said preform and said molten infiltrant charge so that said molten infiltrant charge is a liquid until step (6) of cooling said infiltrated preform.

13. The method of claim 9 wherein step (6) of cooling said infiltrated preform further includes steps of removing said infiltrated preform from said pressure vessel to a chill vessel so that said molten infiltrant solidifies at a selected solidification rate.

14. The method of claim 9 wherein said molten infiltrant charge reacts with and consumes said preform to form a bulk compound according to a reactive infiltration process.

15. The method of claim 9 wherein step (6) of cooling said infiltrated preform further includes steps of providing a chill zone in said pressure vessel and withdrawing said infiltrated preform into said chill zone so that said molten infiltrant charge solidifies at a selected solidification rate.

16. The method of claim 15 further including a step of controlling said selected solidification rate by providing a hot top on said infiltrated preform.

17. The method of claim 9 wherein said preform includes a primary particulate reinforcement phase.

18. The method of claim 17 wherein said primary particulate reinforcement phase is a high melting point metal selected from the group consisting of Mo, W, Cr, Nb, and Ta.

19. The method of claim 17 wherein said primary particulate reinforcement phase is a refractory material selected from the group consisting of titanium diboride, aluminum oxide, yttrium oxide, boron nitride, silicon carbide silicon nitride, titanium carbide, zirconium carbide, hafnium carbide, tungsten carbide, niobium carbide boron carbide, titanium nitride, zirconium nitride, hafnium nitride and diamond.

20. The method of claim 9 wherein in step (2) said infiltrant charge is heated in an infiltrant heating vessel to form said molten infiltrant charge and said preform is heated in a preform heating vessel to form a preheated preform.

21. The method of claim 20 wherein said perform heating vessel includes vacuum equipment for evacuating said preform.

22. The method of claim 21 further comprising a step of exposing said molten infiltrant charge to said preheated preform before step (4) of transferring said preheated preform and said molten infiltrant charge to said pressure vessel.

23. The method of claim 9 wherein said pressure vessel is maintained at ambient temperature and said preform and said molten infiltrant charge are insulated from said pressure vessel so that said molten infiltrant is a liquid until step (6) of cooling said infiltrated preform.

24. The method of claim 23 wherein step (4) further includes a step of providing an insulated transfer container for transferring said preform and said molten infiltrant charge to said pressure vessel.

25. The method of claim 23 wherein step (4) further includes a step of providing a heated transfer container for transferring said preform and said molten infiltrant charge to said pressure vessel.

26. The method of claim 9 wherein step (5) of pressurizing said pressure vessel is conducted at a pressure selected to create a pressure differential sufficient to cause said molten infiltrant charge to flow into said preform.

27. The method of claim 26 wherein said pressure is in the range of from about 50 atm to about 150 atm.

28. The method of claim 26 wherein said pressure is in the range of from about 1 atm to about 1500 atm.

29. The method of claim 26 wherein said pressure is in the range of from about 20 atm to about 500 atm.

30. The method of claim 9 wherein said preform includes a continuous fiber reinforcement.

31. The method of claim 30 wherein said fiber reinforcement is a monofilament fiber reinforcement selected from the group consisting of slurry-spun alumina, sol-gel derived alumina, sapphire, yttrium aluminum garnet (YAG), yttria-alumina eutectic, titanium diboride, boron nitride, boron carbide and titanium carbide monofilament fiber reinforcements.

32. The method of claim 30 wherein said continuous fiber reinforcement is a continuous fiber reinforcement selected from the group consisting of aluminum oxide, silicon carbide, organometallic-derived silicon carbide, pitch-based graphitic carbon, organometallic-derived silicon nitride, polyacrylonitrile (PAN)-based, organometallic-derived titanium carbide and organometallic-derived mixed TiC and SiC fiber reinforcements.

33. The method of claim 30 wherein said preform further includes a secondary particulate reinforcement phase and is a hybrid preform.

34. The method of claim 33 wherein said secondary particulate reinforcement phase is a high melting point metal selected from the group consisting of Mo, W, Cr, Nb and Ta.

35. The method of claim 33 wherein said secondary particulate reinforcement phase is a refractory material selected from the group consisting of titanium diboride, aluminum oxide, yttrium oxide, boron nitride, silicon carbide, silicon nitride, titanium carbide, zirconium carbide, hafnium carbide, tungsten carbide, niobium carbide, boron carbide, titanium nitride, zirconium nitride, hafnium nitride and diamond.

* * * * *